United States Patent
Inomata et al.

(10) Patent No.: US 9,112,414 B2
(45) Date of Patent: Aug. 18, 2015

(54) MATRIX CONVERTER HAVING A PLURALITY OF BIDIRECTIONAL SWITCHES FOR A COMMUTATION OPERATION AND CONTROL METHOD THEREFOR

(71) Applicant: Kabushiki Kaisha Yaskawa Denki, Kitakyushu-shi (JP)

(72) Inventors: Kentaro Inomata, Kitakyushu (JP); Shinya Morimoto, Kitakyushu (JP); Mamoru Takaki, Kitakyushu (JP); Yoshiyasu Takase, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/203,579

(22) Filed: Mar. 11, 2014

(65) Prior Publication Data

US 2014/0254230 A1    Sep. 11, 2014

(30) Foreign Application Priority Data

Mar. 11, 2013    (JP) ................................ 2013-048443

(51) Int. Cl.
*H02M 5/275* (2006.01)
*H02M 5/293* (2006.01)
*H02M 5/297* (2006.01)

(52) U.S. Cl.
CPC .............. *H02M 5/293* (2013.01); *H02M 5/297* (2013.01)

(58) Field of Classification Search
CPC ........ H02K 47/30; H02M 5/271; H02M 5/14; H02M 5/27; H03B 19/00
USPC ......... 363/148, 149, 157, 159, 160, 161, 162, 363/163, 164, 165
See application file for complete search history.

(56) References Cited

U.S. PATENT DOCUMENTS

| 5,852,559 | A | * | 12/1998 | Li | 363/163 |
|---|---|---|---|---|---|
| 5,892,677 | A | * | 4/1999 | Chang | 363/152 |
| 5,949,672 | A | * | 9/1999 | Bernet | 363/159 |
| 6,704,215 | B2 | * | 3/2004 | Simon | 363/159 |
| 6,771,524 | B2 | * | 8/2004 | Miguchi | 363/149 |
| 7,626,840 | B2 | * | 12/2009 | Ueda | 363/163 |

(Continued)

FOREIGN PATENT DOCUMENTS

| JP | 2008-048550 A | 2/2008 |
|---|---|---|
| JP | 2012-239265 A | 12/2012 |
| WO | 2008/108147 A1 | 9/2008 |

*Primary Examiner* — Adolf Berhane
*Assistant Examiner* — Alex Torres-Rivera
(74) *Attorney, Agent, or Firm* — Hubbs, Enatsky & Inoue PLLC

(57) ABSTRACT

Provided is a matrix converter including a power converter, a commutation controller, and a compensator. The power converter includes a plurality of bidirectional switches. The commutation controller performs one of a three-step commutation operation and a four-step commutation operation by the bidirectional switches as a switch source and the bidirectional switches as a switch destination when an input terminal to be connected to an output terminal is switched by on/off control of the bidirectional switches. The compensator compensates for an output voltage error generated when the input terminal to be connected to the output terminal is switched, based on a potential difference before and after the switching of the input terminal to be connected to the output terminal, an output current of the output terminal, and capacitance between input and output terminals of unidirectional switches.

13 Claims, 32 Drawing Sheets

(56) References Cited

U.S. PATENT DOCUMENTS

| | | | |
|---|---|---|---|
| 8,045,354 B2* | 10/2011 | Lacaze | 363/160 |
| 2003/0112640 A1* | 6/2003 | Briesen et al. | 363/13 |
| 2004/0027843 A1* | 2/2004 | Mahlein et al. | 363/159 |
| 2008/0285314 A1* | 11/2008 | Kojori | 363/37 |
| 2009/0225569 A1* | 9/2009 | Begalke | 363/17 |
| 2009/0322276 A1 | 12/2009 | Yamanaka | |
| 2010/0091534 A1* | 4/2010 | Tadano | 363/157 |
| 2011/0116295 A1* | 5/2011 | Ueda et al. | 363/163 |
| 2012/0287686 A1* | 11/2012 | Yamamoto | 363/78 |
| 2013/0208519 A1* | 8/2013 | Yamamoto et al. | 363/67 |

* cited by examiner

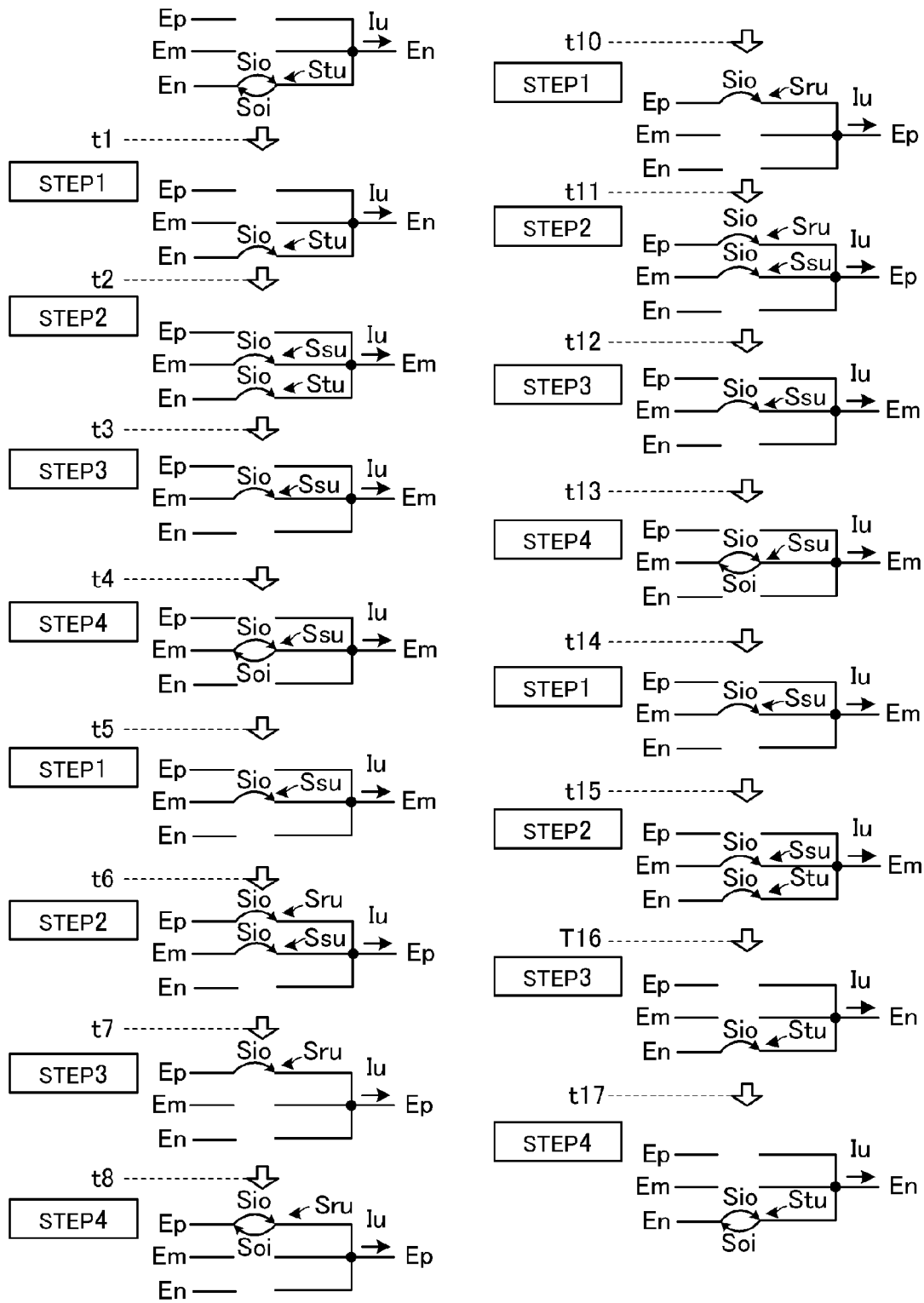

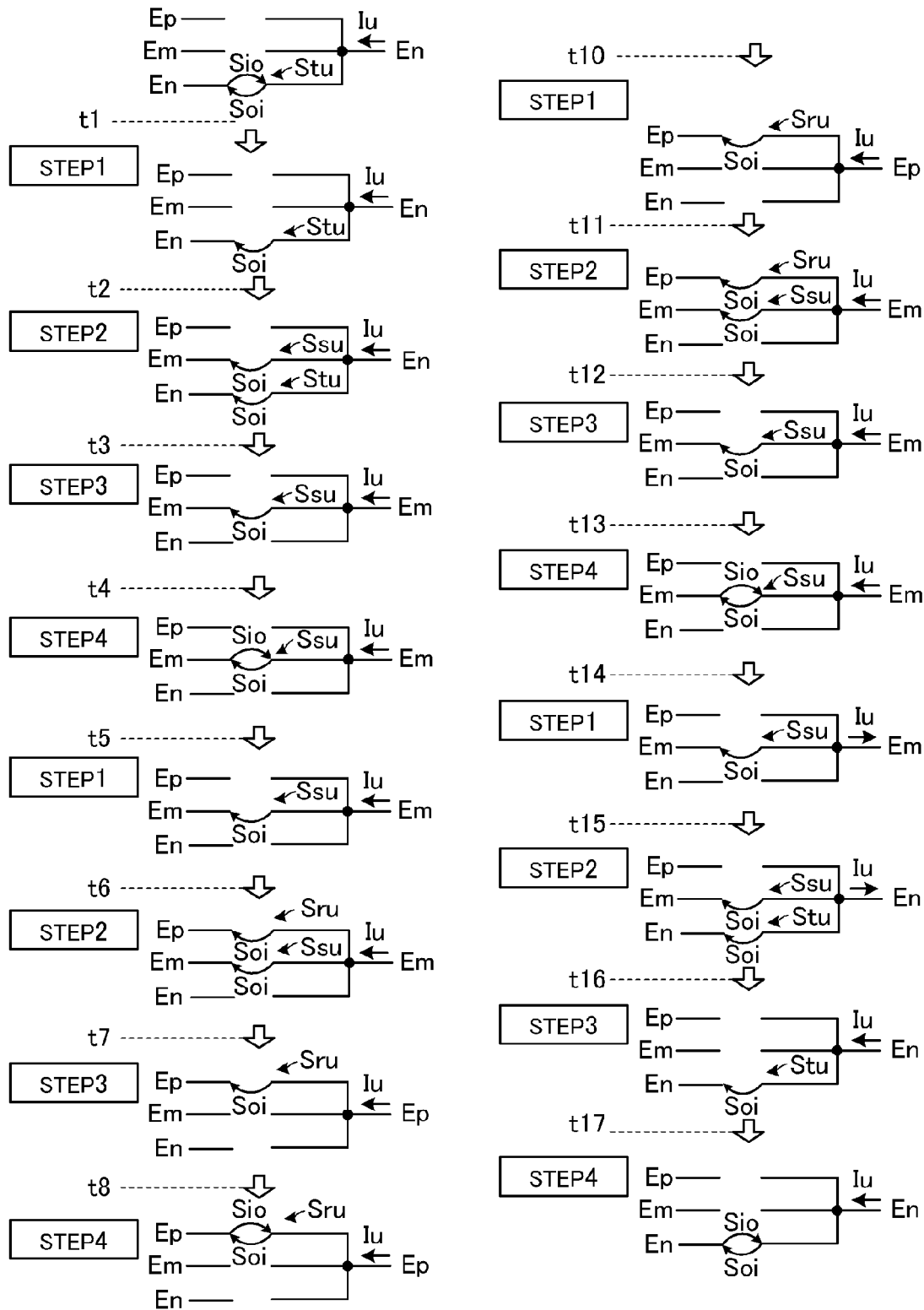
FIG.7B    IN CASE OF Iu<0

FIG.8A

| STATE OF BIDIRECTIONAL SWITCH S | CIRCUIT STATE | RELATIONSHIP BETWEEN POTENTIAL DIFFERENCE AND CHARGE ACCUMULATED IN PARASITIC CAPACITANCE Cp |
|---|---|---|
| FIRST STATE<br><br>Vi —(Sio/Soi)— Vo | Vi —(Dio, Sio / Soi, Doi)— Vo | Q vs Vi−Vo: point at origin |
| SECOND STATE<br><br>Vi —(Sio)→ Vo | Vi —(Dio, Cp / Sio / Doi)— Vo | Q vs Vi−Vo: line through origin, slope atan(Cp), in left half |
| THIRD STATE<br><br>Vi ←(Soi)— Vo | Vi —(Dio / Soi, Cp, Doi)— Vo | Q vs Vi−Vo: line through origin, slope atan(Cp), in right half |
| FOURTH STATE<br><br>Vi     Vo | Vi —(Dio, Cp / Cp, Doi)— Vo | Q vs Vi−Vo: line through origin, slope atan(Cp) |

FIG.8B
| STATE OF BIDIRECTIONAL SWITCH S | CIRCUIT STATE | RELATIONSHIP BETWEEN POTENTIAL DIFFERENCE AND CHARGE ACCUMULATED IN PARASITIC CAPACITANCE Cp |
|---|---|---|
| FIRST STATE 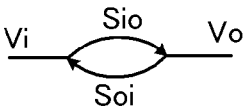 | 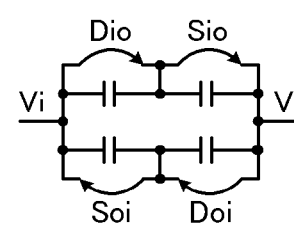 | 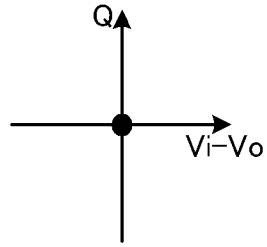 |
| SECOND STATE  | 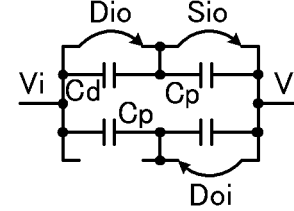 | 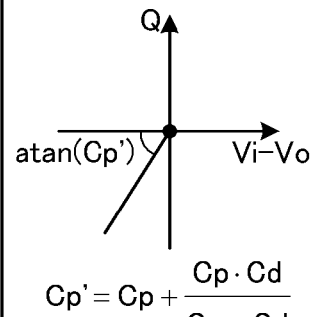 $Cp' = Cp + \dfrac{Cp \cdot Cd}{Cp + Cd}$ |
| THIRD STATE  | 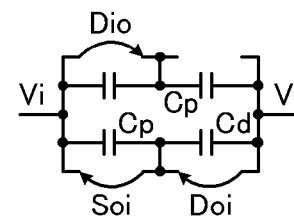 | 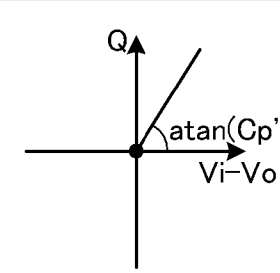 $Cp' = Cp + \dfrac{Cp \cdot Cd}{Cp + Cd}$ |
| FOURTH STATE  | 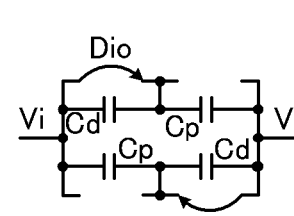 | 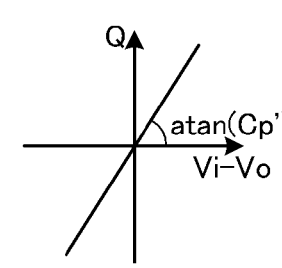 $Cp' = Cp + \dfrac{Cp \cdot Cd}{Cp + Cd}$ |

FIG.8C

| STATE OF BIDIRECTIONAL SWITCH S | CIRCUIT STATE | RELATIONSHIP BETWEEN POTENTIAL DIFFERENCE AND CHARGE ACCUMULATED IN PARASITIC CAPACITANCE Cp |
|---|---|---|
| FIRST STATE | | |
| SECOND STATE | | |
| THIRD STATE | | |
| FOURTH STATE | | |

FIG.9
| STATE OF BIDIRECTIONAL SWITCH S | CIRCUIT STATE | RELATIONSHIP BETWEEN POTENTIAL DIFFERENCE AND CHARGE ACCUMULATED IN PARASITIC CAPACITANCE Cp |
|---|---|---|
| FIRST STATE 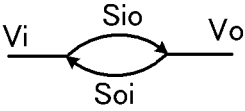 | 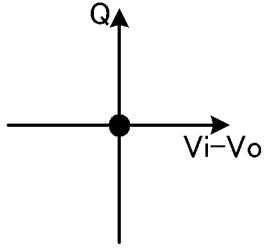 | 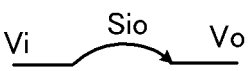 |
| SECOND STATE 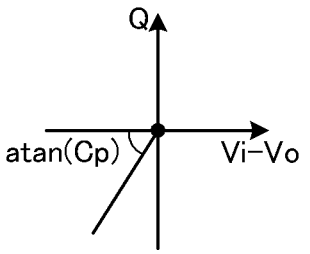 |  | 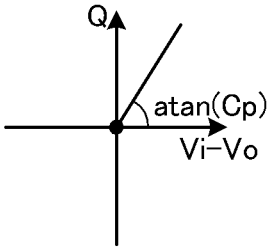 |
| THIRD STATE  | 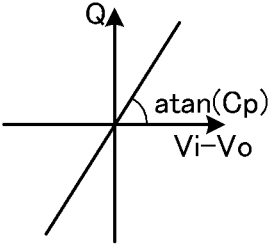 | |
| FOURTH STATE | | |

IN CASE OF Io>0

IN CASE OF Io<0

IN CASE OF Iu>0

IN CASE OF Iu<0

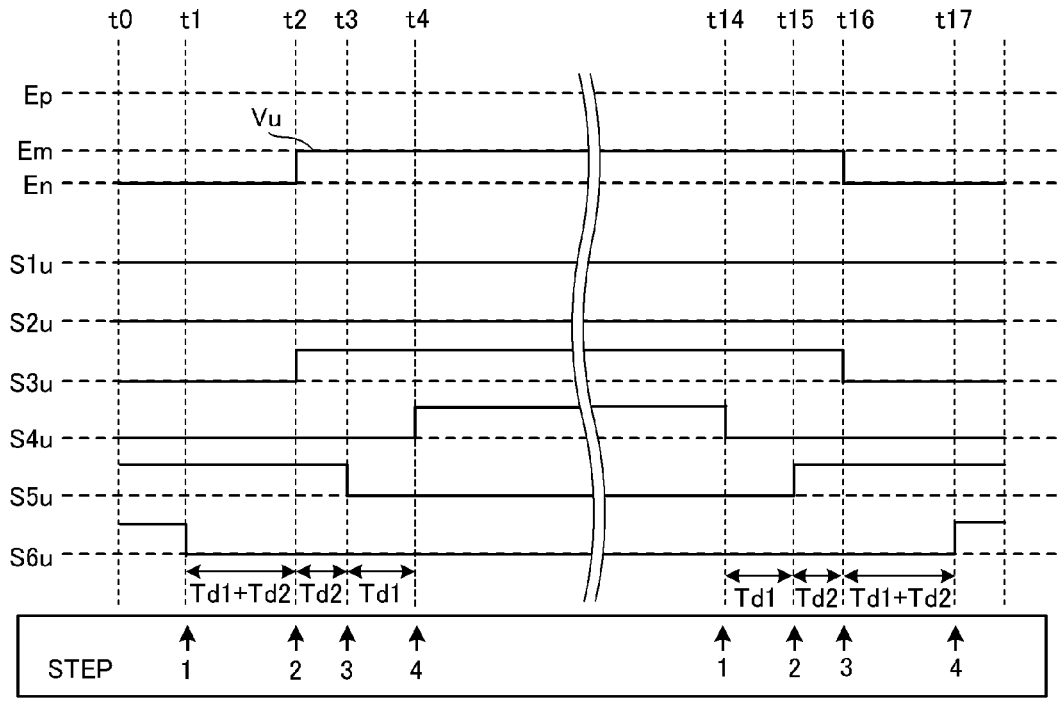
FIG.24A  IN CASE OF Iu>0
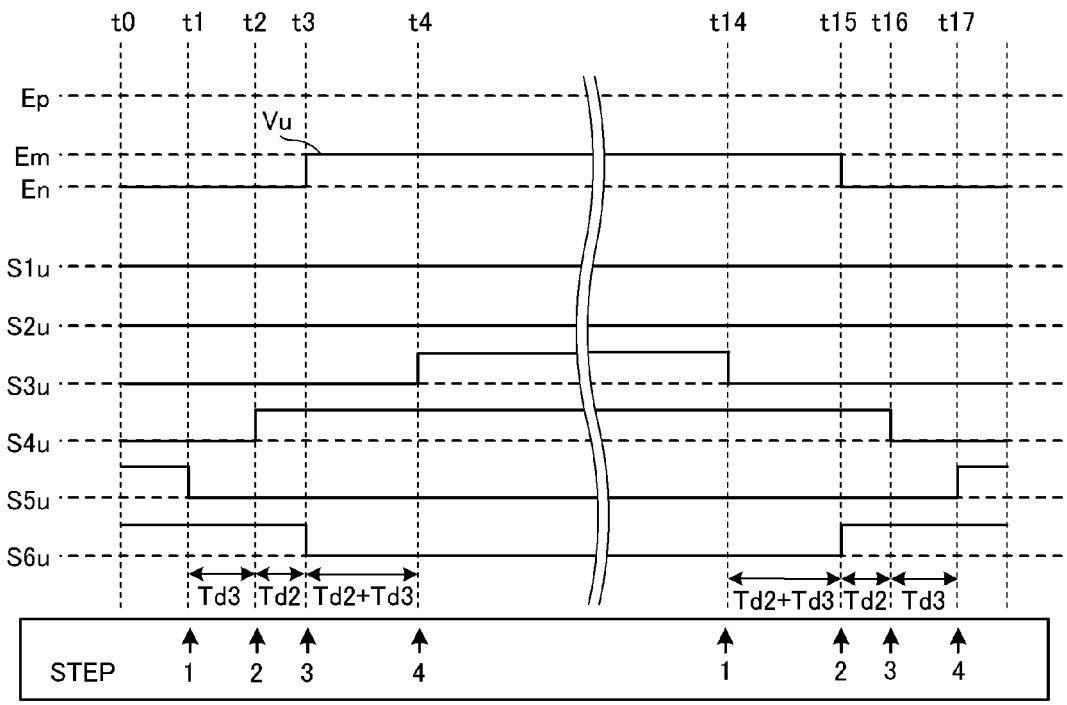
FIG.24B  IN CASE OF Iu<0

MATRIX CONVERTER HAVING A PLURALITY OF BIDIRECTIONAL SWITCHES FOR A COMMUTATION OPERATION AND CONTROL METHOD THEREFOR

INCORPORATION BY REFERENCE

The present disclosure contains subject matter related to that disclosed in Japanese Priority Patent Application JP2013-048443 filed in the Japan Patent Office on Mar. 11, 2013, the entire contents of which are hereby incorporated by reference.

BACKGROUND OF THE INVENTION

1. Field of the Invention

The embodiments disclosed herein relate to a matrix converter and a control method therefor.

2. Description of the Related Art

A matrix converter includes a plurality of bidirectional switches for connecting an AC power source and a load, and controls those bidirectional switches for direct switching of phase voltages of the AC power source so as to output an arbitrary voltage and frequency to the load.

In the matrix converter, the phases of the AC power source to be connected to the load are switched by the bidirectional switches by controlling each of a plurality of unidirectional switches constructing the bidirectional switch to be turned on and off separately in a predetermined order (this series of switching operation is referred to as a commutation operation). By this commutation operation, a short circuit between the phases of the AC power source, an open output phase of the matrix converter, or the like can be prevented (see, for example, International Patent W02008/108147A).

However, a parasitic capacitance exists as a capacitance between an input terminal and an output terminal of the unidirectional switches constructing the bidirectional switch (when a snubber capacitor is connected between the input and output terminals, the capacitance between the input and output terminals is the parasitic capacitance plus a capacitance of the snubber capacitor). This parasitic capacitance causes distortion of output voltage or output current, and hence drive performance of the matrix converter may be deteriorated.

One aspect of the embodiment is made in view of the above description, and it is an object thereof to provide a matrix converter and a control method therefor, which can reduce the distortion of output voltage or output current due to the parasitic capacitance.

SUMMARY OF THE INVENTION

A matrix converter according to one aspect of the embodiment includes a power converter, a commutation controller, and a compensator. The power converter includes a plurality of bidirectional switches disposed between, on a first end, a plurality of input terminals connected to phases of an AC power source and on a second end to a plurality of output terminals connected to phases of a load. The commutation controller is configured to perform one of a three-step commutation operation and a four-step commutation operation by the bidirectional switches as a switch source and the bidirectional switches as a switch destination when the input terminal to be connected to the output terminal is switched by on/off control of the bidirectional switches. The compensator is configured to compensate for an output voltage error generated when the input terminal to be connected to the output terminal is switched, based on at least a potential difference before and after the switching of the input terminal to be connected to the output terminal, an output current of the output terminal, and capacitance between input and output terminals of unidirectional switches included in the bidirectional switches.

BRIEF DESCRIPTION OF THE DRAWINGS

FIG. 7A is a diagram showing a state of the unidirectional switch shown in FIG. 6A.

FIG. 7B is a diagram showing a state of the unidirectional switch shown in FIG. 6B.

FIG. 8A is a diagram showing a relationship between a potential difference between an input voltage and the output phase voltage and electric charge accumulated in a parasitic capacitance in first to fourth states of the bidirectional switch illustrated in FIG. 2A.

FIG. 8B is a diagram showing the relationship between the potential difference between the input voltage and the output phase voltage and the electric charge accumulated in the parasitic capacitance in the first to fourth states of the bidirectional switch illustrated in FIG. 2B.

FIG. 8C is a diagram showing the relationship between the potential difference between the input voltage and the output phase voltage and the electric charge accumulated in the parasitic capacitance in the first to fourth states of the bidirectional switch illustrated in FIG. 2C.

FIG. 9 is a diagram showing the relationship between the potential difference between the input voltage and the output phase voltage and the electric charge accumulated in the parasitic capacitance in the first to fourth states of the bidirectional switch in the structural example of the bidirectional switch illustrated in FIG. 4.

FIG. 24A is a diagram showing a relationship among the output phase voltage, the gate signal, and each step of the commutation operation in the case where the output phase current is positive in the four-step current commutation operation.

FIG. 24B is a diagram showing a relationship among the output phase voltage, the gate signal, and each step of the commutation operation in the case where the output phase current is negative in the four-step current commutation operation.

DESCRIPTION OF THE EMBODIMENTS

Now, a matrix converter according to embodiments of the present disclosure is described in detail with reference to the attached drawings. The following embodiments are not intended to limit this invention.

(First Embodiment)

Figure 1:
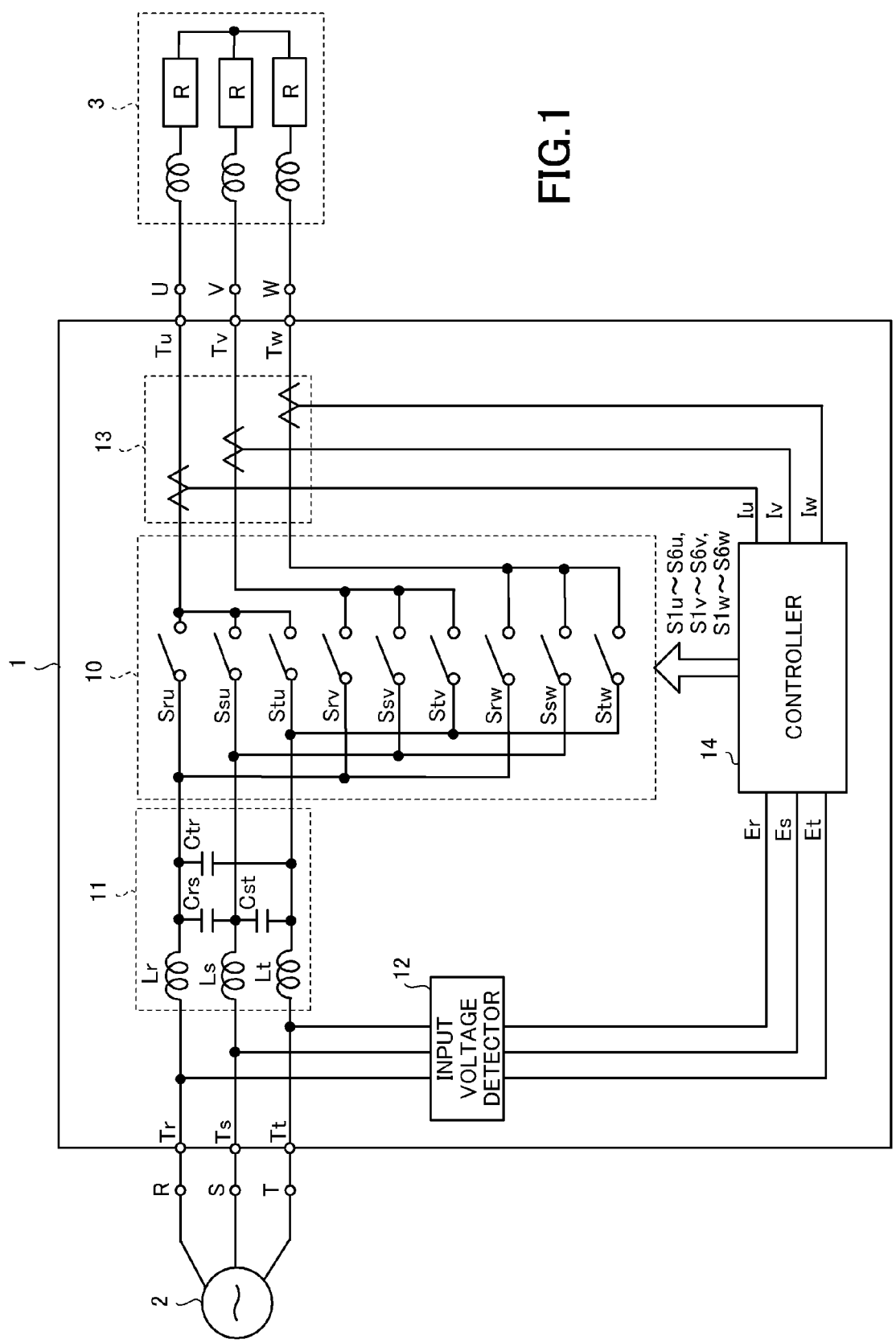
FIG. 1 is a diagram illustrating a matrix converter according to a first embodiment.

FIG. 1 is a diagram illustrating a structure of a matrix converter according to a first embodiment. As illustrated in FIG. 1, the matrix converter 1 according to the first embodiment is disposed between a three-phase AC power source 2 (hereinafter referred to simply as an AC power source 2) and a load 3. The load 3 is an AC motor, for example. In the following description, a side of the AC power source 2 is referred to as an input side, and a side of the load 3 is referred to as an output side. In addition, an R phase, an S phase, and a T phase of the AC power source 2 are referred to as input phases, while a U phase, a V phase, and a W phase of the load 3 are referred to as output phases.

The matrix converter 1 has input terminals Tr, Ts, and Tt and output terminals Tu, Tv, and Tw. The input terminals Tr, Ts, and Tt are connected to the R phase, the S phase, and the T phase of the AC power source 2, and the output terminals Tu, Tv, and Tw are connected to the U phase, the V phase, and the W phase of the load 3. The matrix converter 1 converts three-phase AC power supplied from the AC power source 2 via the input terminals Tr, Ts, and Tt into three-phase AC power having an arbitrary voltage and frequency, and then outputs the converted AC power to the load 3 via the output terminals Tu, Tv, and Tw.

As illustrated in FIG. 1, the matrix converter 1 includes a power converter 10, an LC filter 11, an input voltage detector 12, an output current detector 13, and a controller 14.

The power converter 10 includes a plurality of bidirectional switches Sru, Ssu, Stu, Srv, Ssv, Stv, Srw, Ssw, and Stw for connecting phases of the AC power source 2 to phases of the load 3 (hereinafter sometimes generically referred to as bidirectional switches S).

The bidirectional switches Sru, Ssu, and Stu respectively connect the R phase, the S phase, and the T phase of the AC power source 2 to the U phase of the load 3. The bidirectional switches Srv, Ssv, and Stv respectively connect the R phase, the S phase, and the T phase of the AC power source 2 to the V phase of the load 3. The bidirectional switches Srw, Ssw, and Stw respectively connect the R phase, the S phase, and the T phase of the AC power source 2 to the W phase of the load 3.

Figure 2A:
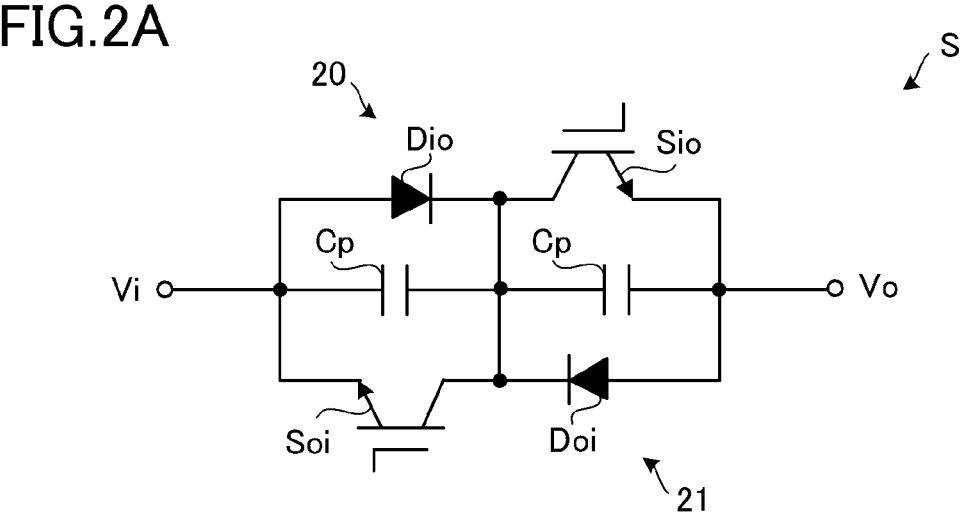
FIG. 2A is a diagram illustrating a structural example of a bidirectional switch illustrated in FIG. 1.

The bidirectional switch S is configured by anti-parallel connection of series connections of a unidirectional switch and a diode. FIG. 2A is a diagram illustrating a structural example of the bidirectional switch S. As illustrated in FIG. 2A, the bidirectional switch S is configured by connecting a series connection 20 of a unidirectional switch Sio and a diode Dio and a series connection 21 of a unidirectional switch Soi and a diode Doi in antiparallel connection.

Between the input and output terminals of the unidirectional switches Sio and Soi, there is a capacitance called a parasitic capacitance (Cp). In the example illustrated in FIG. 2A, for easy understanding of description, the parasitic capacitance Cp is illustrated separately from the unidirectional switches Sio and Soi. For instance, the unidirectional switches Sio and Soi are a semiconductor switching element such as a metal-oxide-semiconductor field-effect transistor (MOSFET) and an insulated gate bipolar transistor (IGBT). In addition, SiC or GaN as a next-generation semiconductor switching element may also be used.

Figure 2B:
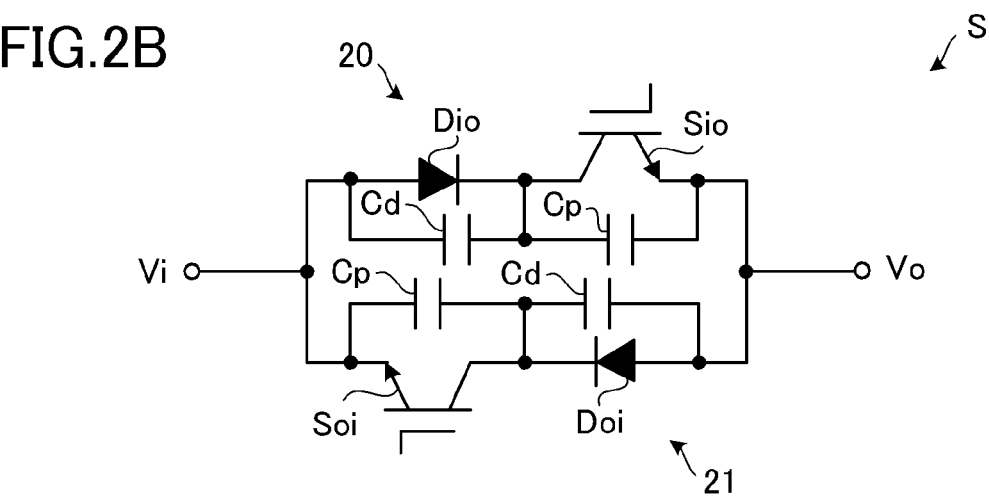
FIG. 2B is a diagram illustrating another structural example of the bidirectional switch illustrated in FIG. 1.
Figure 2C:
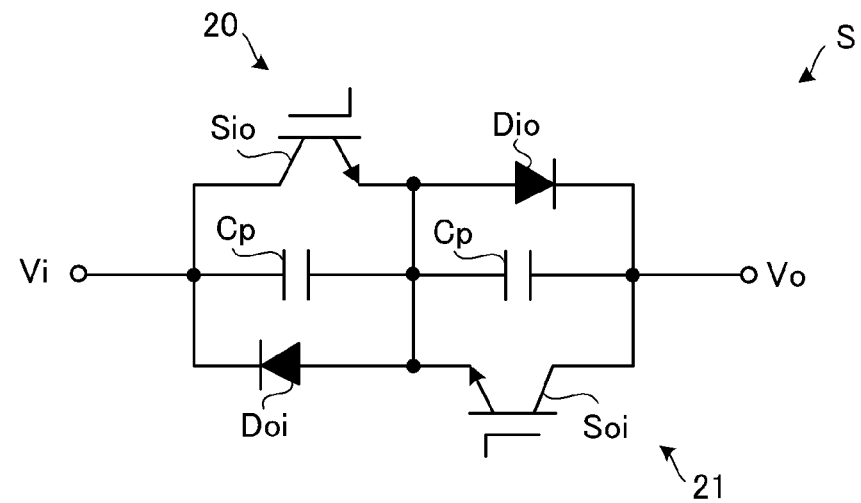
FIG. 2C is a diagram illustrating still another structural example of the bidirectional switch illustrated in FIG. 1.
Figure 4:
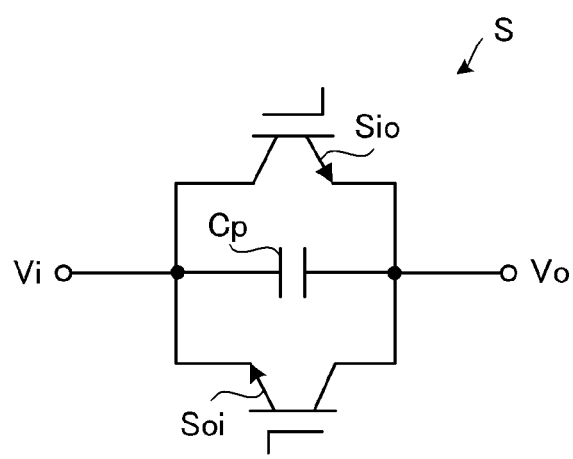
FIG. 4 is a diagram illustrating a structural example of another bidirectional switch.

The bidirectional switch S is not limited to the structure illustrated in FIG. 2A. For instance, the bidirectional switch S may have a structure as illustrated in FIG. 2B, in which collectors of the unidirectional switches Sio and Soi are not connected to each other. In addition, the bidirectional switch S may have a structure as illustrated in FIG. 2C, in which the connection order of the unidirectional switch and the diode forming the series connection is changed. In addition, it is possible to adopt a little different structure as illustrated in FIG. 4, in which IGBTs with resistance to a reverse bias (state where an emitter side of the IGBT is applied with a higher voltage than a collector side thereof) are connected to each other in antiparallel.

The LC filter 11 is disposed between the power converter 10 and the R phase, the S phase, and the T phase of the AC power source 2, so as to suppress occurrence of a high frequency current flowing into the AC power source 2 from the power converter 10. Specifically, the LC filter 11 includes three reactors Lr, Ls, and Lt and three capacitors Crs, Cst, and Ctr, and removes high frequency components due to switching of the bidirectional switches S constructing the power converter 10.

The input voltage detector 12 detects respective voltage values Er, Es, and Et of the R phase, the S phase, and the T phase of the AC power source 2 (hereinafter referred to as input phase voltages Er, Es, and Et). Note that, the input phase voltages Er, Es, and Et are sometimes generically referred to as an input phase voltage Vi hereinafter.

The output current detector 13 detects a current flowing between the power converter 10 and the load 3. Specifically, the output current detector 13 detects current instantaneous values Iu, Iv, and Iw (hereinafter referred to as output phase currents Iu, Iv, and Iw) flowing between the power converter 10 and each of the U phase, the V phase, and the W phase of the load 3. Note that, the output phase currents Iu, Iv, and Iw are sometimes generically referred to as an output current Io hereinafter. In addition, voltage instantaneous values output from the power converter 10 to each of the U phase, the V phase, and the W phase of the load 3 are referred to as output phase voltages Vu, Vv, and Vw. The output phase voltages Vu, Vv, and Vw are sometimes generically referred to as an output voltage Vo.

The controller 14 generates gate signals $S1u$ to $S6u$, $S1v$ to $S6v$, and $S1w$ to $S6w$ based on the input phase voltages Er, Es, and Et detected by the input voltage detector 12 and the output phase currents Iu, Iv, and Iw detected by the output current detector 13.

Figure 3:
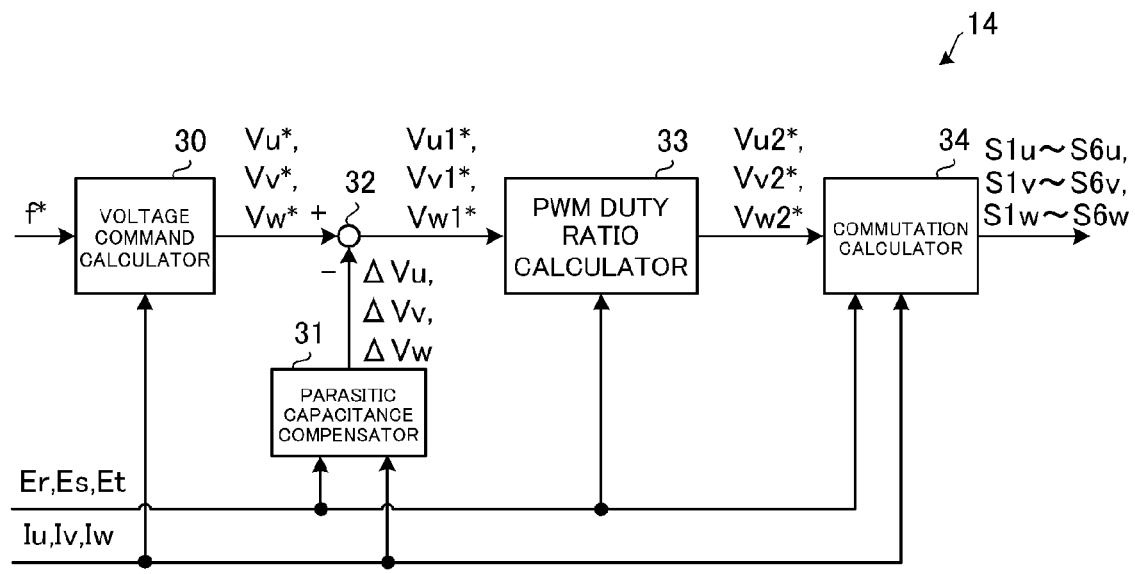
FIG. 3 is a diagram illustrating a structural example of a controller illustrated in FIG. 1.

FIG. 3 is a diagram illustrating a structural example of the controller 14. As illustrated in FIG. 3, the controller 14 includes a voltage command calculator 30, a parasitic capacitance compensator 31 (an example of a compensator), a subtractor 32, a PWM duty ratio calculator 33, and a commutation calculator 34 (an example of a commutation controller).

The voltage command calculator 30 generates and outputs voltage commands Vu*, Vv*, and Vw* of the output phases (hereinafter sometimes generically referred to as a voltage command Vo*) based on a frequency command f* and the output phase currents Iu, Iv, and Iw. The frequency command f* is a frequency command of the output phase voltages Vu, Vv, and Vw.

The parasitic capacitance compensator 31 generates compensation values ΔVu, ΔVv, and ΔVw based on the input phase voltages Er, Es, and Et, the output phase currents Iu, Iv, and Iw, and a parasitic capacitance value. The compensation values ΔVu, ΔVv, and ΔVw compensate for errors of the output phase voltages Vu, Vv, and Vw due to the parasitic capacitance Cp of the unidirectional switches Soi and Sio constructing the bidirectional switches S of the power converter 10.

The subtractor 32 subtracts the compensation values ΔVu, ΔVv, and ΔVw from the voltage commands Vu*, Vv*, and Vw* so as to generate voltage commands Vu1*, Vv1*, and Vw1* (hereinafter sometimes generically referred to as a voltage command Vo1*), and outputs the voltage commands Vu1*, Vv1*, and Vw1* to the PWM duty ratio calculator 33.

The PWM duty ratio calculator 33 generates PWM voltage commands Vu2*, Vv2*, and Vw2* based on the voltage commands Vu1*, Vv1*, and Vw1* and the input phase voltages Er, Es, and Et. Technologies of generating the PWM voltage commands Vu2*, Vv2*, and Vw2* are well known, and examples thereof are described in Japanese Patent Application Laid-open No. 2008-048550 and Japanese Patent Application Laid-open No. 2012-239265.

For instance, the PWM duty ratio calculator 33 determines input phase voltages Ep, Em, and En in a descending order of absolute values of the input phase voltages Er, Es, and Et in a period in which a magnitude relationship among the absolute values of the input phase voltages Er, Es, and Et does not change.

In addition, the PWM duty ratio calculator 33 converts the voltage commands Vu1*, Vv1*, and Vw1* into pulse width modulation signals corresponding to voltage values of the input phase voltages Ep, Em, and En, and outputs the results as the PWM voltage commands Vu2*, Vv2*, and Vw2*, respectively.

The commutation calculator 34 determines a switching order of the bidirectional switches in the commutation based on polarities of the output phase currents or a magnitude relationship among the input phase voltages Ep, Em, and En with respect to the PWM voltage commands Vu2*, Vv2*, and Vw2*, and generates the gate signals S1u to S6u, S1y to S6v, and S1w to S6w. The gate signals S1u to S6u, S1v to S6v, and S1w to S6w are respectively input to the unidirectional switches Sio and Soi of the bidirectional switches S constructing the power converter 10. Thus, the unidirectional switches Sio and Soi are controlled to be turned on and off.

Figure 5:
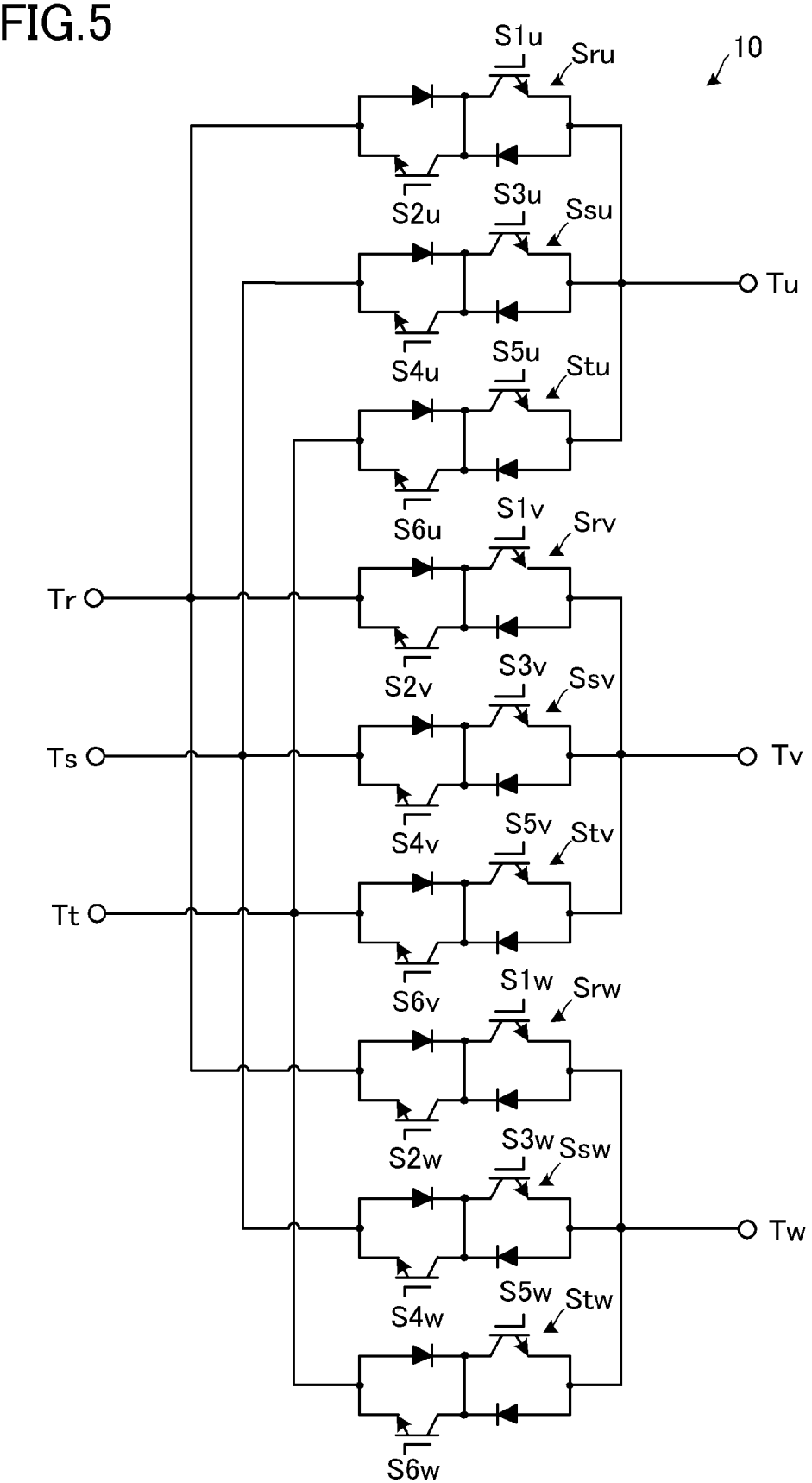
FIG. 5 is a diagram showing a correspondence relationship between a unidirectional switch and a gate signal in a plurality of bidirectional switches.

FIG. 5 is a diagram showing a correspondence relationship between the unidirectional switches Sio and Soi and the gate signals S1u to S6u, S1v to S6v, and S1w to S6w in the plurality of bidirectional switches Sru, Ssu, Stu, Srv, Ssv, Sty, Srw, Ssw, Stw.

The unidirectional switch Sio of the bidirectional switch Sru (see FIG. 2A) is controlled to be turned on and off by the gate signal S1u, and the unidirectional switch Soi of the bidirectional switch Sru (see FIG. 2A) is controlled by the gate signal S2u. In addition, the unidirectional switch Sio of the bidirectional switch Ssu is controlled to be turned on and off by the gate signal S3u, and the unidirectional switch Soi of the bidirectional switch Ssu is controlled by the gate signal S4u. In addition, the unidirectional switch Sio of the bidirectional switch Stu is controlled to be turned on and off by the gate signal S5u, and the unidirectional switch Soi of the bidirectional switch Stu is controlled by the gate signal S6u.

Similarly, the unidirectional switches Sio and Soi of the bidirectional switches Srv, Ssv, and Sty are controlled to be turned on and off by the gate signals S1y to S6v, and the unidirectional switches Sio and Soi of the bidirectional switches Srw, Ssw, and Stw are controlled by the gate signals S1w to S6w.

Here, a four-step current commutation operation is described. The commutation calculator 34 generates the gate signals Stu to S6u, S1y to S6v, and S1w to S6w for performing PWM control including the four-step current commutation operation. The four-step current commutation operation is performed by a switching pattern corresponding to a polarity of the output current Io.

When the polarity of the output current Io flowing from the AC power source 2 to the load 3 is positive (Io>0), the commutation operation is performed by the following switching pattern of Steps 1 to 4.

Step 1: Turn off a unidirectional switch having a polarity opposite to that of the output current Io among the unidirectional switches constructing the bidirectional switch S as a switch source.

Step 2: Turn on a unidirectional switch having the same polarity as that of the output current Io among the unidirectional switches constructing the bidirectional switch S as the switch destination.

Step 3: Turn off the unidirectional switch having the same polarity as that of the output current Io among the unidirectional switches constructing the bidirectional switch S as the switch source.

Step 4: Turn on the unidirectional switch having the polarity opposite to that of the output current Io among the unidirectional switches constructing the bidirectional switch S as the switch destination.

The above-mentioned four-step current commutation operation is described below with reference to FIGS. 6A, 6B, 7A, and 7B, in which the U phase is exemplified. The commutation operations of the V phase and the W phase are the same as the commutation operation of the U phase, and hence description thereof is omitted.

Figure 6A:
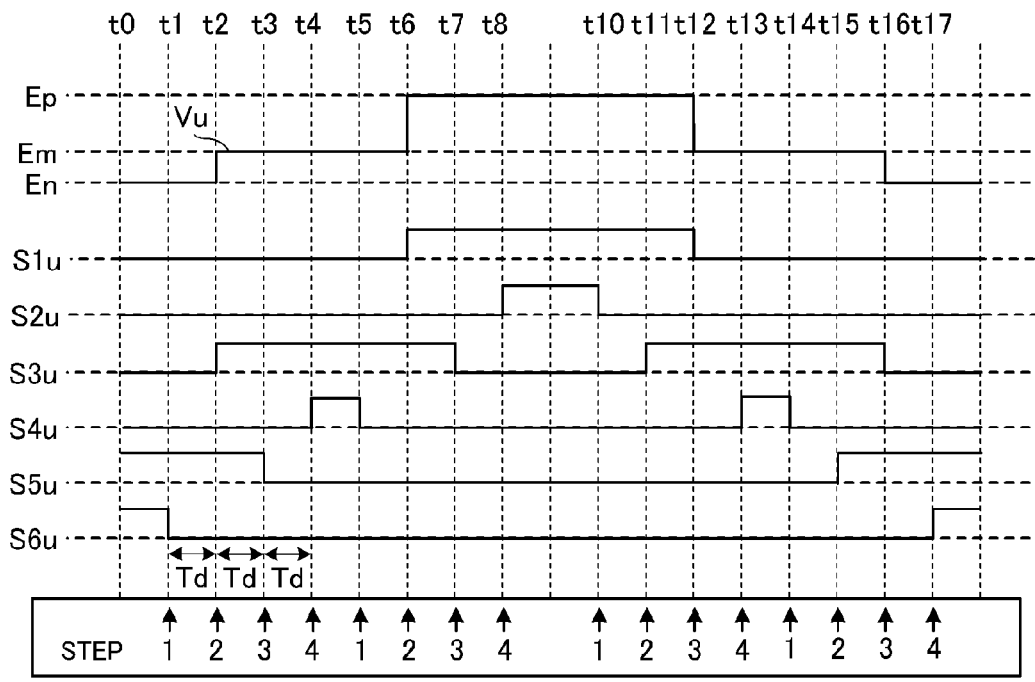
FIG. 6A is a diagram showing a relationship among an output phase voltage, the gate signal, and each step of a commutation operation in a case where an output phase current is positive in a four-step current commutation operation.
Figure 6B:
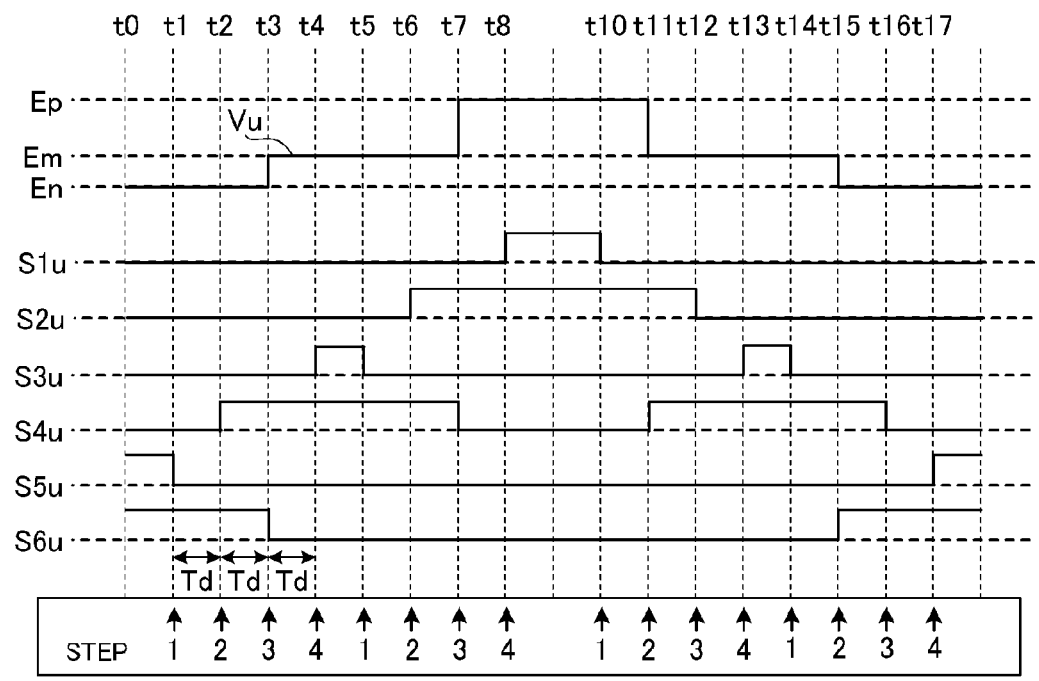
FIG. 6B is a diagram showing a relationship among the output phase voltage, the gate signal, and each step of the commutation operation in a case where the output phase current is negative in the four-step current commutation operation.

FIGS. 6A and 6B are diagrams showing a relationship among the output phase voltage Vu, the gate signals S1u to S6u, and each step of the commutation operation. FIG. 6A shows the commutation operation in a case where the output phase current Iu is positive. FIG. 6B shows the commutation operation in a case where the output phase current Iu is negative. In addition, FIGS. 7A and 7B are diagrams showing states of the unidirectional switches Sio and Soi at time points t1 to t17 shown in FIGS. 6A and 6B, respectively. It is assumed that Ep=Er, Em=Es, and En=Et are satisfied.

When the gate signal S6u changes from High level to Low level at the time point t1 as shown in FIG. 6A, the unidirectional switch Soi in a polarity opposite to that of the output phase current Iu is turned off in the bidirectional switch Stu that is a switch source bidirectional switch as shown in FIG. 7A (Step 1).

Next, when the gate signal S3u changes from Low level to High level at the time point t2, the unidirectional switch Sio in the same polarity as that of the output phase current Iu is turned on in the bidirectional switch Ssu that is a switch destination bidirectional switch as shown in FIG. 7A (Step 2).

Next, when the gate signal S5u changes from High level to Low level at the time point t3, the unidirectional switch Sio in the same polarity as that of the output phase current Iu is turned off in the bidirectional switch Stu as shown in FIG. 7A (Step 3).

Next, when the gate signal S4u changes from Low level to High level at the time point t4, the unidirectional switch Soi in the polarity opposite to that of the output phase current Iu is turned on in the bidirectional switch Ssu as shown in FIG. 7A (Step 4).

Also at the time points t5 to t8, t10 to t13, t14 to t17 shown in FIG. 6A and time points t1 to t4, t5 to t8, t10 to t13, and t14 to t17 shown in FIG. 6B, similarly to the case of the time points t1 to t4, a switching process of Steps 1 to 4 is performed as shown in FIGS. 7A and 7B. An interval Td between the steps (hereinafter referred to as a step interval Td) is set to be longer than a turn-on time and a turn-off time of the unidirectional switches Sio and Soi. The step intervals Td are set to the same value for convenience of description, but different values may be set.

By performing the four-step current commutation operation in this way, a voltage to be output as the output phase voltage Vu can be changed from En to Em, from Em to Ep, from Ep to Em, and from Em to En, while preventing a short circuit between phases of the AC power source 2, an open output phase of the matrix converter 1.

By the way, the parasitic capacitance Cp exists as a capacitance between the input and output terminals of the unidirectional switches Sio and Soi constructing the bidirectional switches S (when a snubber capacitor is connected between the input and output terminals, the capacitance between the input and output terminals is the parasitic capacitance plus a capacitance of the snubber capacitor). This parasitic capacitance Cp may cause distortion of the output voltage Vo or the output current Io, and hence drive performance of the matrix converter may be deteriorated. Therefore, in the matrix converter 1 according to this embodiment, as described above, the parasitic capacitance compensator 31 and the subtractor 32 are disposed so as to compensate for an error of the output voltage Vo (hereinafter referred to as an output voltage error) due to the parasitic capacitance Cp in the commutation operation and to reduce distortion of the output voltage Vo or the output current Io.

Here, the output voltage error due to the parasitic capacitance Cp existing between the input and output terminals of the unidirectional switches Sio and Soi is described.

As described above, in the matrix converter 1 according to this embodiment, turning on and off of the unidirectional switches Sio and Soi constructing the bidirectional switches S are separately controlled in accordance with a predetermined order, and hence the four-step commutation operation is performed. The bidirectional switch S has four states, namely a first state in which both the unidirectional switches Sio and Soi are on, a second state in which only the unidirectional switch Sio is on, a third state in which only the unidirectional switch Soi is on, and a fourth state in which both the unidirectional switches Sio and Soi are off.

FIG. 8A is a diagram showing a relationship between a potential difference Va (=Vi−Vo) between the input phase voltage Vi and the output voltage Vo and an electric charge Q accumulated in the parasitic capacitance Cp in the first to fourth states of the bidirectional switch S illustrated in FIG. 2A. On-resistances of the unidirectional switches Sio and Soi are neglected.

As shown in FIG. 8A, when the bidirectional switch S is in the first state, a path from the input side to the output side is in a conductive state because of the turned-on unidirectional switch Sio and the diode Dio, and a path from the output side to the input side is also in the conductive state because of the turned-on unidirectional switch Soi and the diode Doi. Therefore, when the bidirectional switch S is in the first state, the bidirectional switch S can be regarded as conductive in both directions, and hence the electric charge Q accumulated in the parasitic capacitance Cp can be neglected as substantially zero.

When the bidirectional switch S is in the second state, the path from the input side to the output side is in the conductive state because of the turned-on unidirectional switch Sio and the diode Dio. However, because the unidirectional switch Soi is off, the output side is connected to the input side via the parasitic capacitance Cp existing between the input and output terminals of the unidirectional switch Soi. Therefore, when the bidirectional switch S is in the second state and the input phase voltage Vi is lower than the output voltage Vo, that is, when the potential difference Va (=Vi−Vo) is negative, the electric charge Q corresponding to the potential difference Va is accumulated in the parasitic capacitance Cp.

When the bidirectional switch S is in the third state, the path from the output side to the input side is in the conductive state because of the turned-on unidirectional switch Soi and the diode Doi. However, because the unidirectional switch Sio is off, the input side is connected to the output side via the parasitic capacitance Cp existing between the input and output terminals of the unidirectional switch Sio. Therefore, when the bidirectional switch S is in the third state and the input phase voltage Vi is higher than the output voltage Vo, that is, when the potential difference Va (=Vi−Vo) is positive, the electric charge Q corresponding to the potential difference Va is accumulated in the parasitic capacitance Cp.

When the bidirectional switch S is in the fourth state, because both the unidirectional switches Sio and Soi are off, the input side is connected to the output side via the parasitic capacitance Cp existing between the input and output terminals of the turned-off unidirectional switch Sio, and the output side is connected to the input side also via the parasitic capacitance Cp existing between the input and output terminals of the turned-off unidirectional switch Soi. Therefore, when the bidirectional switch S is in the fourth state, the bidirectional switch S works as a capacitor of the parasitic capacitance Cp, and hence the electric charge Q corresponding to the potential difference Va is accumulated in the parasitic capacitance Cp.

The above description can be applied not only to the structure of the bidirectional switch S illustrated in FIG. 2A but also to the structures of the bidirectional switches S illustrated in FIGS. 2B and 2C. FIG. 8B is a diagram showing a relationship between a potential difference between the input voltage and the output phase voltage and the electric charge Q accumulated in a total parasitic capacitance value Cp' (Cp'=Cp+Cp·Cd/(Cp+Cd)) in the first to fourth states of the bidirectional switch S illustrated in FIG. 2B. In addition, FIG. 8C is a diagram showing a relationship between the potential difference between the input voltage and the output phase voltage and the electric charge Q accumulated in the parasitic capacitance Cp in the first to fourth states of the bidirectional switch S illustrated in FIG. 2C.

In addition, the same is true in the structure of the bidirectional switch S illustrated in FIG. 4, as the case of structures of the bidirectional switches S illustrated in FIGS. 2A to 2C. FIG. 9 is a diagram showing a relationship between the potential difference between the input voltage and the output phase voltage and the electric charge Q accumulated in the parasitic capacitance Cp in the first to fourth states of the structural example of the bidirectional switch S illustrated in FIG. 4.

As shown in FIG. 9, when the bidirectional switch S is in the first state, the path from the input side to the output side is in the conductive state because of the turned-on unidirectional switch Sio, and the path from the output side to the input side is also in the conductive state because of the turned-on unidirectional switch Soi. Therefore, when the bidirectional switch S is in the first state, the bidirectional switch S can be regarded to be conductive in both directions, and hence the electric charge Q accumulated in the parasitic capacitance Cp can be neglected as substantially zero.

When the bidirectional switch S is in the second state, the path from the input side to the output side is in the conductive state because of the turned-on unidirectional switch Sio. However, because the unidirectional switch Soi is off, when the input phase voltage Vi is lower than the output voltage Vo, that is, when the potential difference Va (=Vi−Vo) is negative, the electric charge Q corresponding to the potential difference Va is accumulated in the parasitic capacitance Cp.

When the bidirectional switch S is in the third state, the path from the output side to the input side is in the conductive state because of the turned-on unidirectional switch Soi. However, because the unidirectional switch Sio is off, when the input phase voltage Vi is higher than the output voltage Vo, that is, when the potential difference Va (=Vi−Vo) is positive, the electric charge Q corresponding to the potential difference Va is accumulated in the parasitic capacitance Cp.

When the bidirectional switch S is in the fourth state, because both the unidirectional switches Sio and Soi are off, the bidirectional switch S works as a capacitor of the parasitic capacitance Cp, and hence the electric charge Q corresponding to the potential difference Va is accumulated in the parasitic capacitance Cp.

Figure 10A:
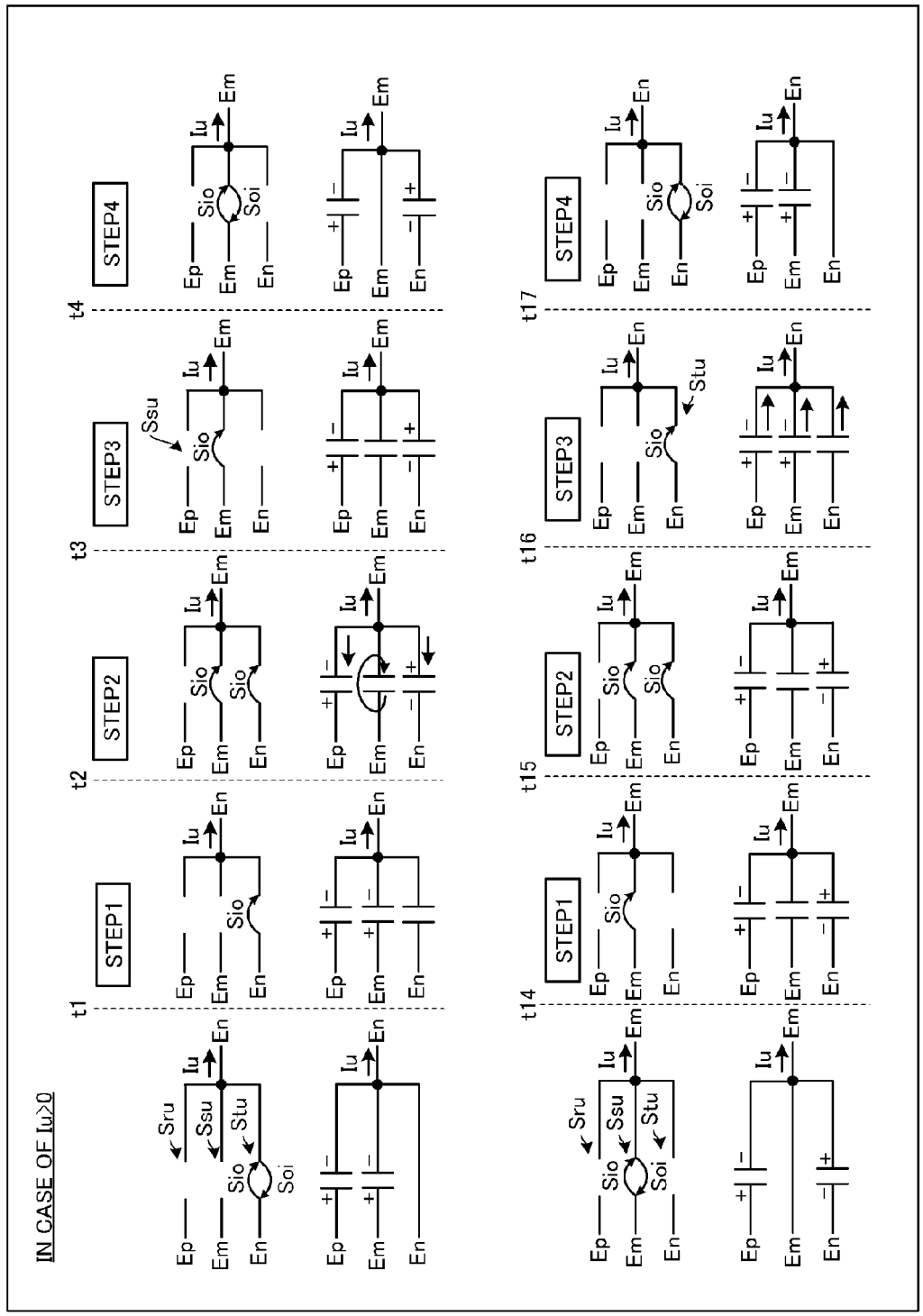
FIG. 10A is a diagram showing a relationship between the state of the bidirectional switch shown in FIG. 6A and the flow of electric charge due to the parasitic capacitance.

Next, there is described how the parasitic capacitance Cp affects the output voltage in the commutation operation in the case where the output current Io is positive. FIG. 10A is a diagram showing a relationship between the states of the bidirectional switch S at the time points t1 to t4 and t14 to t17 shown in FIG. 6A and the flow of electric charge due to the parasitic capacitance Cp.

As shown in FIG. 10A, a charge and discharge start timing with respect to the parasitic capacitance Cp is the time point t2 and the time point t16. At the time point t2, the unidirectional switch Sio of the bidirectional switch Ssu is turned on so that a current flows into the output side from the input side through the bidirectional switch Ssu, and hence the output phase voltage Vu is instantaneously changed from the low voltage En to the high voltage Em. Therefore, influences of the parasitic capacitances Cp of the bidirectional switches Sru, Ssu, and Stu to the output voltage can be neglected.

On the other hand, at the time point t16, the unidirectional switch Sio of the bidirectional switch Ssu is turned off so that the output phase is separated from the high voltage Em, and hence the low voltage En and the output phase are connected to each other through the parasitic capacitances Cp of the bidirectional switches Sru, Ssu, and Stu. Therefore, a voltage value of the output phase gradually changes corresponding to the charge and discharge with respect to the parasitic capacitances Cp of the bidirectional switches Sru, Ssu, and Stu by the output phase current Iu. As a result, an output voltage error occurs due to the parasitic capacitances Cp.

As described above, in the case where the output current Io is positive, when the input phase connected to the output phase is switched from a high voltage phase to a low voltage phase (t14 to t17), an output voltage error occurs due to the parasitic capacitances Cp. In the example shown in FIG. 10A, there is described the example in which the input voltage is switched between Em and En, but the same is true in a case where the input voltage is switched between Ep and Em (t10 to t13).

Figure 10B:
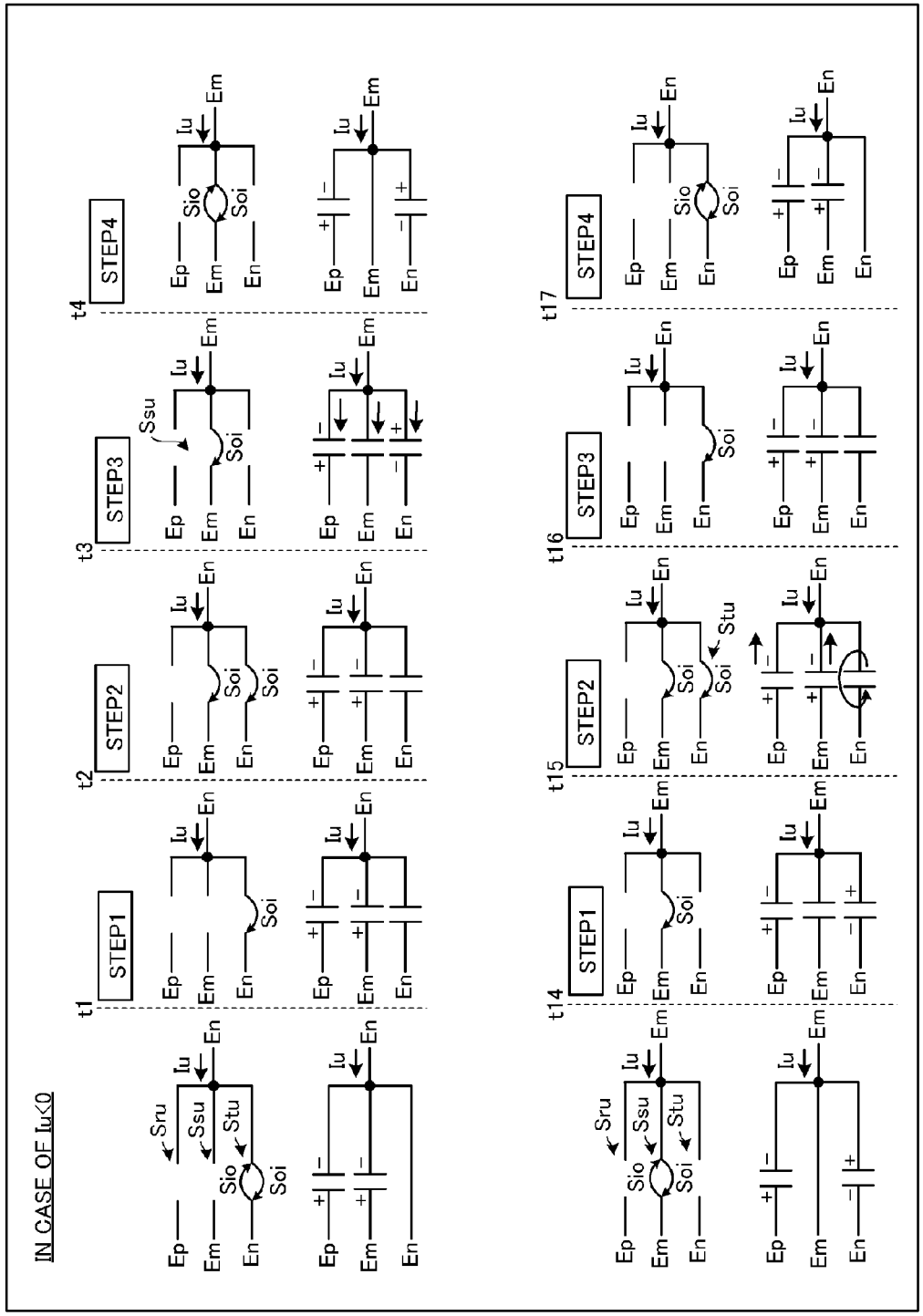
FIG. 10B is a diagram showing a relationship between the state of the bidirectional switch shown in FIG. 6B and the flow of electric charge due to the parasitic capacitance.

Next, there is described how the parasitic capacitance Cp affects the output voltage in the commutation operation in a case where the output current Io is negative. FIG. 10B is a diagram showing a relationship between the states of the bidirectional switch S at the time points t1 to t4 and t14 to t17 shown in FIG. 6B and the flow of electric charge due to the parasitic capacitance Cp.

As shown in FIG. 10B, a charge and discharge start timing with respect to the parasitic capacitance Cp is the time point t3 and the time point t15. At the time point t15, the unidirectional switch Soi of the bidirectional switch Stu is turned on so that a current flows into the input side from the output side through the bidirectional switch Stu, and hence the output phase voltage Vu is instantaneously changed from the high voltage Em to the low voltage En. Therefore, influences of the parasitic capacitances Cp of the bidirectional switches Sru, Ssu, and Stu to the output voltage can be neglected.

On the other hand, at the time point t3, the unidirectional switch Soi of the bidirectional switch Stu is turned off so that the output phase is separated from the low voltage En, and hence the high voltage Em and the output phase are connected to each other through the parasitic capacitances Cp of the bidirectional switches Sru, Ssu, and Stu. Therefore, a voltage value of the output phase gradually changes corresponding to the charge and discharge of the parasitic capacitances Cp of the bidirectional switches Sru, Ssu, and Stu by the output phase current Iu, and hence an output voltage error occurs due to the parasitic capacitances Cp.

As described above, in the case where the output current Io is negative, when the input phase connected to the output phase is switched from a low voltage phase to a high voltage phase (t1 to t4), an output voltage error occurs due to the parasitic capacitances Cp. In the example shown in FIG. 10B, there is described the example in which the input phase connected to the output phase is switched between Em and En, but the same is true in a case where the input phase connected to the output phase is switched between Ep and Em (t5 to t8).

When the load 3 is the AC motor, the load 3 can be regarded as a series circuit of a resistance R and an inductance L. Therefore, the output current Io can be regarded to be constant in a short period in the commutation operation (between t16 and t17 shown in FIG. 6A or between t3 and t4 shown in FIG. 6B).

Therefore, the following relational expression (1) can be derived. Here, $\Delta Q$ represents an electric charge amount of charge and discharge by the parasitic capacitance Cp when the input phase connected to the output phase is switched (hereinafter referred to as a charge and discharge amount $\Delta Q$). In addition, $\Delta t$ represents a period until the charge and discharge of the parasitic capacitance Cp is finished to be a balanced state in a bidirectional switch Srx, Ssx, or Stx (x is any one of u, v, and w) (hereinafter referred to as a charge and discharge time $\Delta t$).

$$\Delta Q = Io \cdot \Delta t \quad (1)$$

In addition, the electric charge $\Delta Q$ of charge and discharge of the parasitic capacitance Cp in the bidirectional switch Srx, Ssx, or Stx can be expressed by the following expression (2) before and after the output voltage Vo is changed. In the expression (2), Vo' represents the output phase voltage before change, Vo represents the output phase voltage after change, Ep', Em', and En' represent the input phase voltages when the output phase voltage before change is Vo', and Ep, Em, and En represent the input phase voltages when the output phase voltage after change is Vo.

$$\Delta Q = Cp(Ep' - Vo') - Cp(Ep - Vo) + Cp(Em' - Vo') - Cp(Em - Vo) + Cp(En' - Vo') - Cp(En - Vo) \quad (2)$$

Because the input phase voltages Ep, Em, and En correspond to the input phase voltages Er, Es, and Et so the three phases are balanced, the above expression (2) can be simplified as the following expression (3).

$$\Delta Q = -3Cp(Vo' - Vo) \quad (3)$$

Then, the following expression (4) can be derived from the above expression (1) and the expression (3). In the expression (4), $\Delta Vo$ represents a voltage difference between the output voltage Vo' before change and the output voltage Vo after change. In other words, $\Delta Vo = Vo' - Vo$ holds.

$$\Delta t = -\frac{3Cp\Delta Vo}{Io} \quad (4)$$

In the above expression (4), when the output current Io becomes close to zero, the calculation result of the charge and discharge time $\Delta t$ becomes a very long time. However, when proceeding to the process of Step 4, because both the two unidirectional switches Sio and Soi of the bidirectional switch S becomes turned on, remaining charge accumulated in the parasitic capacitance Cp flows as a short circuit current through the unidirectional switch. Therefore, the remaining charge in the parasitic capacitance Cp is instantaneously lost. In other words, because the output voltage Vo rapidly changes when Step 4 of the commutation operation is finished, it is possible to neglect the influence of the charge of the parasitic capacitance Cp after proceeding to Step 4.

Therefore, the influence of the parasitic capacitance Cp on the output voltage error changes depending on whether or not the charge and discharge time Δt exceeds the step interval Td that is a period between Step 3 and Step 4 (between t16 and t17 shown in FIG. 6A or between t3 to t4 shown in FIG. 6B). In other words, the influence on the output voltage error changes depending on whether or not the change of the output voltage due to the parasitic capacitance Cp is completed in the period between Step 3 and Step 4.

Figure 11A:
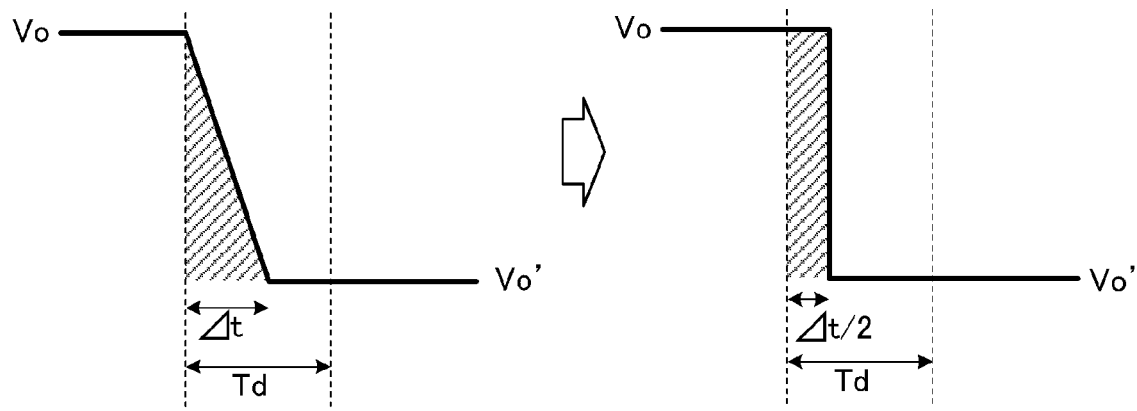
FIG. 11A is a diagram showing an influence of the electric charge accumulated in the parasitic capacitance on an output voltage waveform in a case where $\Delta t \leq Td$ holds.
Figure 11B:
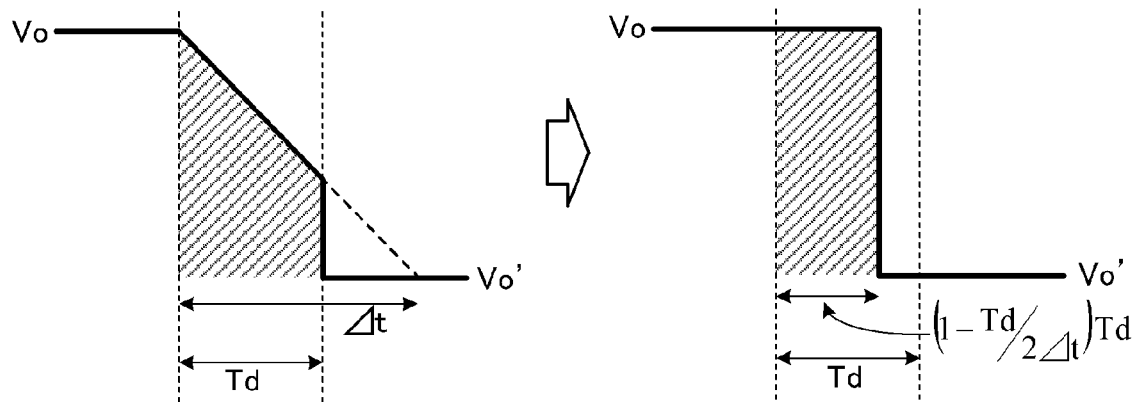
FIG. 11B is a diagram showing an influence of the electric charge accumulated in the parasitic capacitance on the output voltage waveform in a case where Δt>Td holds.

FIG. 11A is a diagram showing the influence of the charge accumulated in the parasitic capacitance Cp on the output voltage waveform in a case where Δt≤Td holds. FIG. 11B is a diagram showing the influence of the charge accumulated in the parasitic capacitance Cp on the output voltage waveform in a case where Δt>Td holds. As shown in the left part of FIG. 11A, when Δt≤Td holds, the discharge of the charge ΔQ is completed before proceeding to Step 4. On the other hand, as shown in the left part of FIG. 11B, when Δt>Td holds, the discharge of the charge ΔQ is not completed before proceeding to Step 4.

The right part of FIG. 11A and the right part of FIG. 11B respectively show a state in which the change of the output phase voltage due to the parasitic capacitance Cp is converted into a rectangular wave. As understood from the right part of FIG. 11A and the right part of FIG. 11B, a component Δm of the output voltage error in the case where Δt≤Td holds can be expressed by the following expression (5), and the component Δm of the output voltage error in the case where Δt>Td holds can be expressed by the following expression (6).

$$\Delta m = \frac{\Delta t \cdot (Vo' - Vo)}{2} \quad (5)$$

$$\Delta m = \left(1 - \frac{Td}{2\Delta t}\right) \cdot Td \cdot (Vo' - Vo) \quad (6)$$

Further, the above-mentioned waveform diagrams of FIGS. 11A and 11B are examples in the case where the output current Io is positive. When the output current Io is negative, there is the influence of the charge of the parasitic capacitance Cp when the output voltage Vo is changed from a low voltage to a high voltage, which causes the waveform diagrams upside down of the diagrams shown in FIGS. 11A and 11B.

Figure 12A:
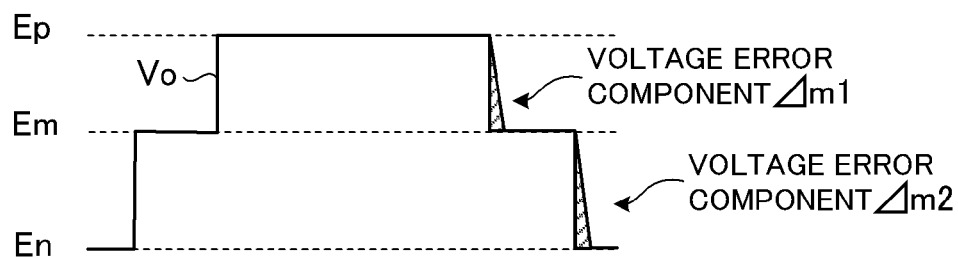
FIG. 12A is a diagram showing a change of the output phase voltage per period of a PWM pulse in the case where the output phase current is positive.

FIG. 12A is a diagram showing a change of the output voltage Vo per period of the PWM pulse in the case where the output current Io is positive. As shown in FIG. 12A, in the case where the output current Io is positive, voltage error components Δm1 and Δm2 per period of the PWM pulse are generated in the period for changing the output voltage Vo from the high voltage to the low voltage.

When a frequency of the PWM pulse shown in FIG. 12A is represented by Fcar in the case where Δt≤Td holds, a voltage error ΔM1 of the output voltage Vo due to the voltage error component Δm1 shown in FIG. 12A can be expressed by the following expression (7) from the above expression (5). In addition, in the case where Δt>Td holds, the voltage error ΔM1 of the output voltage Vo due to the voltage error component Δm1 shown in FIG. 12A can be expressed by the following expression (8) from the above expression (6).

$$\Delta M1 = \frac{\Delta t \cdot (Ep - Em) \cdot Fcar}{2} \quad (7)$$

$$\Delta M1 = \left(1 - \frac{Td}{2\Delta t}\right) \cdot Td \cdot (Ep - Em) \cdot Fcar \quad (8)$$

In addition, in the case where Δt≤Td holds, a voltage error ΔM2 of the output voltage Vo due to the voltage error component Δm2 shown in FIG. 12A can be expressed by the following expression (9) from the above expression (5). In addition, in the case where Δt>Td holds, the voltage error ΔM2 of the output voltage Vo due to the voltage error component Δm2 shown in FIG. 12A can be expressed by the following expression (10) from the above expression (6).

$$\Delta M2 = \frac{\Delta t \cdot (Em - En) \cdot Fcar}{2} \quad (9)$$

$$\Delta M2 = \left(1 - \frac{Td}{2\Delta t}\right) \cdot Td \cdot (Em - En) \cdot Fcar \quad (10)$$

Therefore, in the case where the output current Io is positive, a voltage error ΔM of the output voltage Vo can be determined by adding the voltage error ΔM1 and the voltage error ΔM2 as expressed by the following expression (11).

$$\Delta M = \Delta M1 + \Delta M2 \quad (11)$$

Figure 12B:
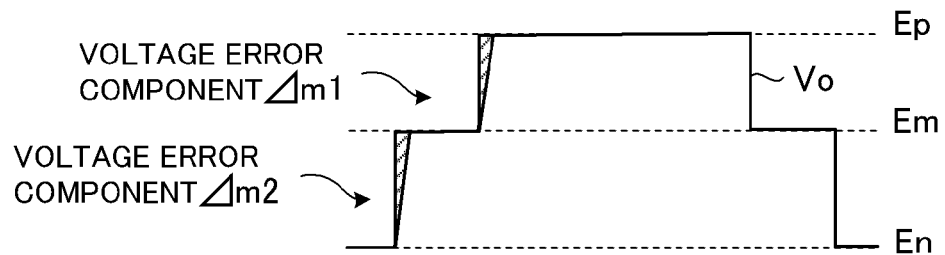
FIG. 12B is a diagram showing a change of the output phase voltage per period of the PWM pulse in the case where the output phase current is negative.

FIG. 12B is a diagram showing a change of the output voltage Vo per period of the PWM pulse in the case where the output current Io is negative. As shown in FIG. 12B, in the case where the output current Io is negative, the voltage error components Δm1 and Δm2 per period of the PWM pulse are generated in the period for changing the output voltage Vo from the low voltage to the high voltage. The voltage error ΔM of the output voltage Vo in the case where the output current Io is negative has a polarity reverse to that in the case where the output current Io is positive, and hence can be determined by reversing the value obtained by adding the voltage error ΔM1 and the voltage error ΔM2 as expressed by the following expression (12).

$$\Delta M = -(\Delta M1 + \Delta M2) \quad (12)$$

As described above, the voltage error ΔM of the output voltage Vo generated by the parasitic capacitance Cp can be determined by case analysis based on whether or not the charge and discharge time Δt exceeds the step interval Td and on a polarity of the output current Io.

The parasitic capacitance compensator 31 determines the voltage error ΔM of the output voltage Vo generated by the parasitic capacitance Cp, generates the compensation value corresponding to the voltage error ΔM, and outputs the compensation value to the subtractor 32 so that the subtractor 32 subtracts the compensation value from the voltage command Vo*. In this way, based on the voltage command Vo1* after compensating for the output voltage error, the power converter 10 can be operated so as to reduce distortion of the output voltage Vo or the output current Io.

Figure 13:
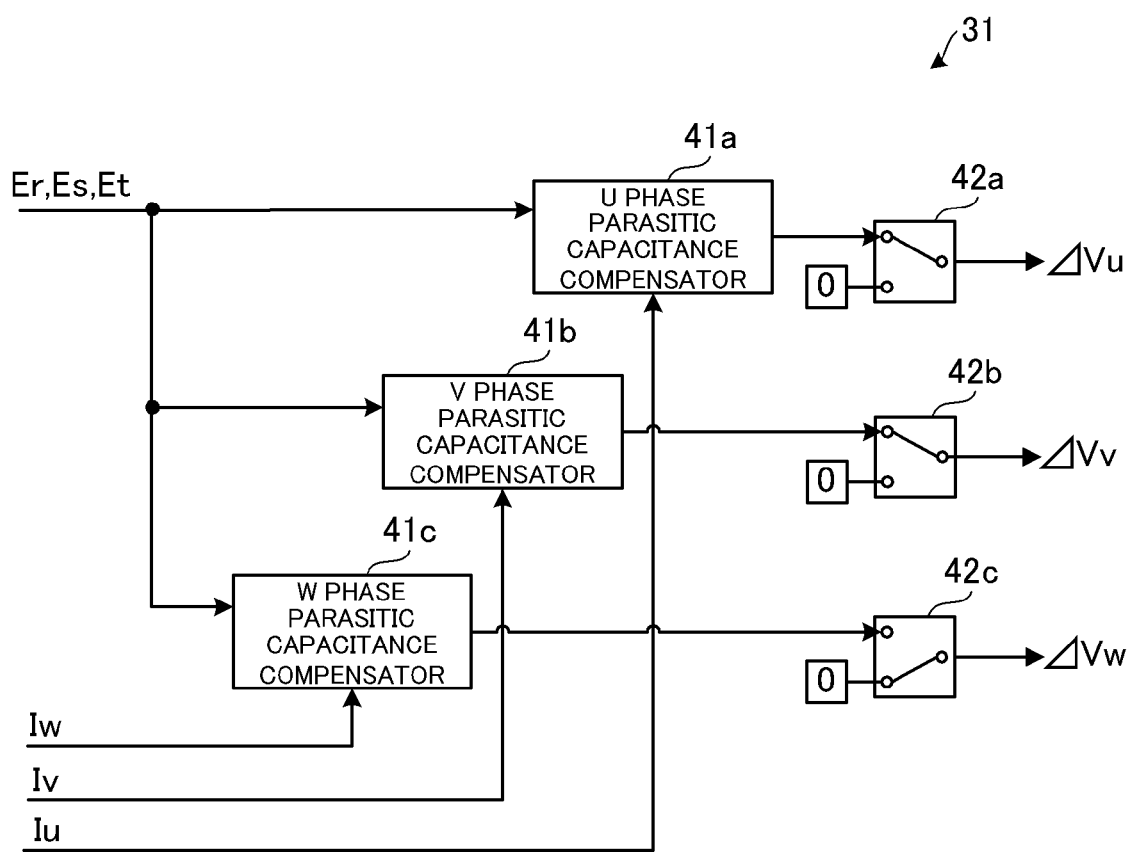
FIG. 13 is a diagram illustrating an example of a structure of a parasitic capacitance compensator.

The output voltage error due to the charge ΔQ occurs in each phase of the U phase, the V phase, and the W phase. The parasitic capacitance compensator 31 generates the compensation value for each phase of the U phase, the V phase, and the W phase. FIG. 13 is a diagram illustrating an example of a structure of the parasitic capacitance compensator 31.

As illustrated in FIG. 13, the parasitic capacitance compensator 31 includes a U phase parasitic capacitance compensator 41a, a V phase parasitic capacitance compensator 41b, a W phase parasitic capacitance compensator 41c, and switches 42a to 42c.

The U phase parasitic capacitance compensator 41a determines a voltage error ΔMu that is the voltage error ΔM of the U phase based on the input phase voltages Er, Es, and Et and the output phase current Iu, and outputs the voltage error ΔMu as a U phase compensation value ΔVu to the subtractor 32. The subtractor 32 outputs a U phase voltage command Vu* obtained by subtracting the compensation value ΔVu as a U phase voltage command Vu1* after compensation to the PWM duty ratio calculator 33.

Similarly, the V phase parasitic capacitance compensator 41b determines a voltage error ΔMv that is the voltage error ΔM of the V phase based on the input phase voltages Er, Es, and Et and the output phase current Iv, and outputs the voltage error ΔMv as a V phase compensation value ΔVv to the subtractor 32. In this way, a V phase voltage command Vv* obtained by subtracting the compensation value ΔVv is output from the subtractor 32 as a V phase voltage command Vv1* after compensation to the PWM duty ratio calculator 33.

In addition, the W phase parasitic capacitance compensator 41c determines a voltage error ΔMw that is the voltage error ΔM of the W phase based on the input phase voltages Er, Es, and Et and the output phase current Iw, and outputs the voltage error ΔMw as a W phase compensation value ΔVw to the subtractor 32. In this way, a W phase voltage command Vw* obtained by subtracting the compensation value ΔVw is output from the subtractor 32 as a W phase voltage command Vw1* after compensation to the PWM duty ratio calculator 33.

The switch 42a outputs the compensation value ΔVu output from the U phase parasitic capacitance compensator 41a to the subtractor 32. On the other hand, the switch 42a outputs zero as the compensation value ΔVu to the subtractor 32 when there is no influence of the parasitic capacitance Cp (for example, when the bidirectional switch S is continuously turned on during a PWM period).

Similarly, the switch 42b outputs the compensation value ΔVv output from the V phase parasitic capacitance compensator 41b to the subtractor 32 while outputting zero to the subtractor 32 when there is no influence of the parasitic capacitance Cp.

In addition, the switch 42c outputs the compensation value ΔVw output from the W phase parasitic capacitance compensator 41c to the subtractor 32 while outputting zero to the subtractor 32 when there is no influence of the parasitic capacitance Cp.

Figure 14:
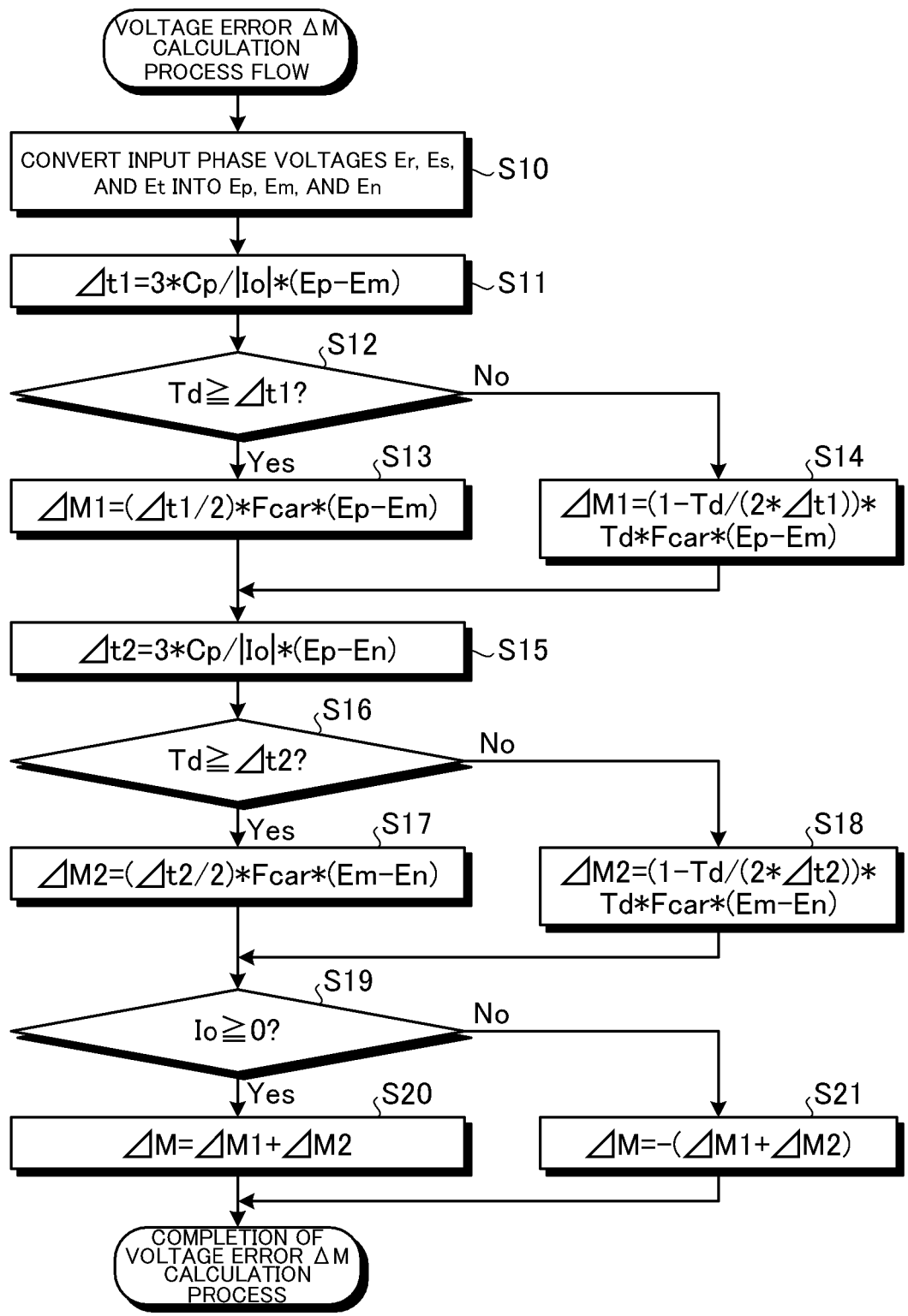
FIG. 14 is a diagram illustrating an example of a calculation process flow of an output voltage error performed by the parasitic capacitance compensator.

Here, an example of a calculation process of the voltage error ΔM in the parasitic capacitance compensators 41a to 41c (hereinafter generically referred to as a parasitic capacitance compensator 41) is described with reference to FIG. 14. FIG. 14 is a diagram illustrating an example of a calculation process flow of the voltage error ΔM performed by the parasitic capacitance compensator 41.

As illustrated in FIG. 14, when starting the calculation process of the voltage error ΔM, the parasitic capacitance compensator 41 first converts the input phase voltages Er, Es, and Et into the input phase voltages Ep, Em, and En (Step S10). Next, the parasitic capacitance compensator 41 calculates the charge and discharge time Δt1 corresponding to the voltage error component Δm1 by using the following expression (13) (Step S11).

$$\Delta t1 = \frac{3Cp \cdot (Ep - Em)}{|Io|} \quad (13)$$

Inside the parasitic capacitance compensator 41, a value of the parasitic capacitance Cp is set in advance. The parasitic capacitance compensator 41 uses the set value of the parasitic capacitance Cp for calculating the above expression (13). The value of the parasitic capacitance Cp can be determined by a parasitic capacitance adjustment process performed by the controller 14. The parasitic capacitance adjustment process is described later in detail. The parasitic capacitance adjustment process is an example of a function as a calculator.

Next, the parasitic capacitance compensator 41 determines whether or not the charge and discharge time Δt1 is within the step interval Td (Step S12). When determining that the charge and discharge time Δt1 is within the step interval Td (Yes in Step S12), the parasitic capacitance compensator 41 calculates the voltage error ΔM1 by using the above expression (7) (Step S13). On the other hand, when determining that the charge and discharge time Δt1 is not within the step interval Td (No in Step S12), the parasitic capacitance compensator 41 calculates the voltage error ΔM1 by using the above expression (8) (Step S14). Here, the step interval Td used herein is, in a strict sense, an interval between Step 3 and Step 4 in the four-step current commutation, or an interval between Step 2 and Step 3 in a four-step voltage commutation (described later).

When the process of Step S13 or Step S14 is finished, the parasitic capacitance compensator 41 calculates a charge and discharge time Δt2 corresponding to the voltage error component Δm2 by using the following expression (14) (Step S15).

$$\Delta t2 = \frac{3Cp \cdot (Em - En)}{|Io|} \quad (14)$$

Next, the parasitic capacitance compensator 41 determines whether or not the charge and discharge time Δt2 is within the step interval Td (Step S16). When determining that the charge and discharge time Δt2 is within the step interval Td (Yes in Step S16), the parasitic capacitance compensator 41 calculates the voltage error ΔM2 by using the above expression (9) (Step S17). On the other hand, when determining that the charge and discharge time Δt2 is not within the step interval Td (No in Step S16), the parasitic capacitance compensator 41 calculates the voltage error ΔM2 by using the above expression (10) (Step S18).

When the process of Step S17 or Step S18 is finished, the parasitic capacitance compensator 41 determines whether or not the output current Io is positive (Step S19). When determining that the output current Io is positive (Yes in Step S19), the parasitic capacitance compensator 41 calculates the voltage error ΔM by using the above expression (11) (Step S20).

On the other hand, when determining that the output current Io is not positive (No in Step S19), the parasitic capacitance compensator 41 calculates the voltage error ΔM by using the above expression (12) (Step S21). When the process of Step S20 or Step S21 is finished, the parasitic capacitance compensator 41 finishes the calculation process of the voltage error ΔM.

As described above, in the matrix converter 1 according to this embodiment, the voltage error ΔM due to the parasitic capacitance Cp is determined for each output phase in the commutation operation, and the voltage error ΔM is subtracted from the voltage command Vo* for each output phase. Therefore, distortion of the output voltage Vo or the output current Io due to the parasitic capacitance Cp can be reduced, and hence deterioration of the drive performance of the matrix converter 1 can be suppressed.

Figure 15A:
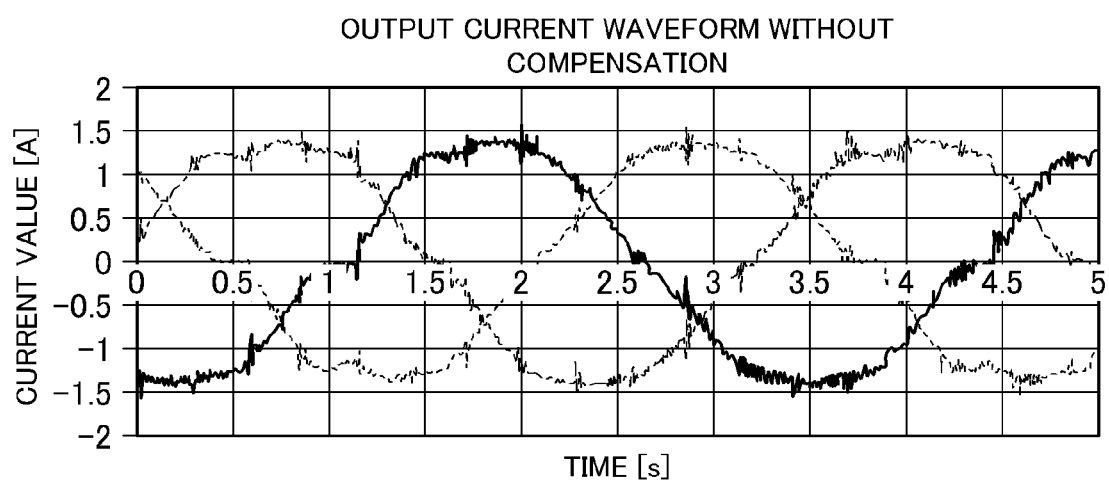
FIG. 15A is a graph showing an example of an output current waveform in a case where the output voltage error due to the parasitic capacitance is not compensated for a voltage command.

FIG. 15A is a graph showing an example of waveforms of the output phase currents Iu, Iv, and Iw in a case where the output voltage error due to the parasitic capacitance Cp is not compensated for the voltage commands Vu*, Vv*, and Vw*. On the other hand, FIG. 15B is a graph showing an example of waveforms of the output phase currents Iu, Iv, and Iw in a case where the output voltage error due to the parasitic capacitance Cp is compensated for the voltage commands Vu*, Vv*, and Vw*.

Figure 15B:
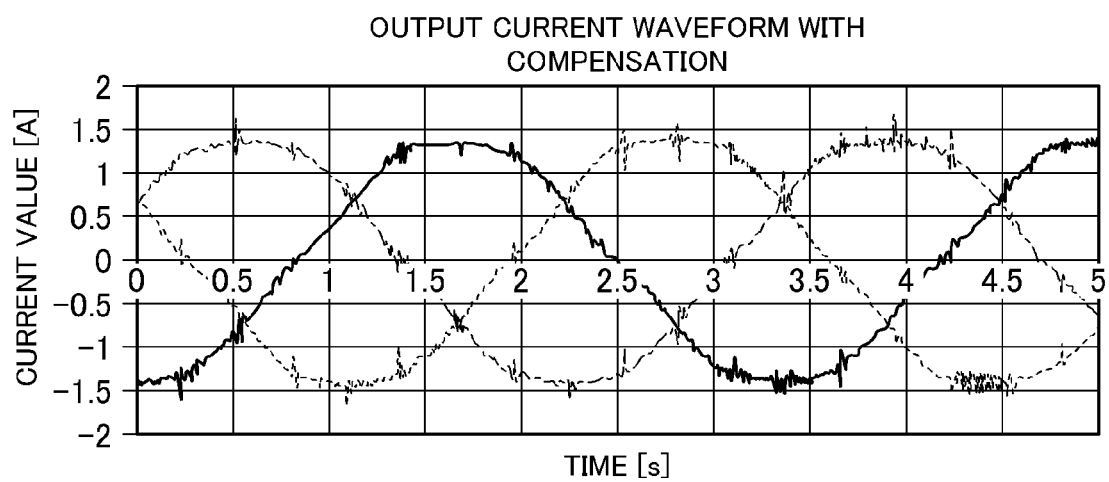
FIG. 15B is a graph showing an example of the output current waveform in a case where the output voltage error due to the parasitic capacitance is compensated for the voltage command.

As shown in FIG. 15A and FIG. 15B, it is understood that the waveform distortions of the output phase currents Iu, Iv, and Iw in the case where the output voltage error due to the parasitic capacitance Cp is compensated are reduced compared to the waveforms of the output phase currents Iu, Iv, and Iw in the case where the output voltage error due to the parasitic capacitance Cp is not compensated.

In the above-mentioned embodiment, the output voltage error due to the parasitic capacitance Cp is compensated by subtracting the voltage error ΔM from the voltage command. However, the method of compensating for the output voltage error is not limited to the above-mentioned method. In other words, other methods can be adopted as long as the voltage error ΔM due to the parasitic capacitance Cp can be compensated.

Specifically, also by adjusting the start timing of the commutation operation, it is possible to compensate for the output voltage error due to the parasitic capacitance Cp. For instance, when the voltage error ΔM is positive, each switch timing of t1 to t4 (or t5 to t8) shown in FIG. 6A is delayed in accordance with the voltage error ΔM, or each switch timing of t14 to t17 (or t10 to t13) shown in FIG. 6A is advanced. In addition, when the voltage error ΔM is negative, each switch timing of t1 to t4 (or t5 to t8) shown in FIG. 6B is advanced in accordance with the voltage error ΔM, or each switch timing of t14 to t17 (or t10 to t13) shown in FIG. 6B is delayed.

In addition, also by adjusting the interval between steps in the commutation operation, it is possible to compensate for the output voltage error due to the parasitic capacitance Cp. For instance, when the voltage error ΔM is positive, in accordance with the voltage error ΔM, intervals shown in FIG. 6A are increased or decreased, specifically, an interval between t1 and t2 is increased while an interval between t2 and t3 is decreased (or an interval between t5 and t6 is increased while an interval between t6 and t7 is decreased), or an interval between t15 and t16 is decreased while an interval between t16 and t17 is increased (or an interval between t11 and t12 is decreased while an interval between t12 and t13 is increased). In addition, when the voltage error ΔM is negative, in accordance with the voltage error ΔM, the intervals shown in FIG. 6B are increased or decreased, specifically, the interval between t1 and t2 is decreased while the interval between t2 and t3 is increased (or the interval between t5 and t6 is decreased while the interval between t6 and t7 is increased), or the interval between t15 and t16 is increased while the interval between t16 and t17 is decreased (or the interval between t11 and t12 is increased while the interval between t12 and t13 is decreased).

In addition, in the above-mentioned embodiment, the four-step current commutation operation is described. However, in the four-step voltage commutation operation or in a three-step commutation operation, the output voltage error due to the parasitic capacitance Cp is generated in the same manner. Therefore, the above-mentioned compensation method can be applied to those commutation operations.

The four-step voltage commutation operation is a commutation method for determining an order of turning on and off the unidirectional switches Sio and Soi constructing the bidirectional switches S before and after switching based on the levels of the input phase voltage Vi in order to prevent a short circuit between input phases and an open output phase, and the commutation operation is performed by the switching pattern including the following Step 1 to Step 4. In this four-step voltage commutation operation, it is not necessary to change the switching pattern in accordance with the polarity of the output current Io.

Step 1: Turn on the unidirectional switch to be reversely biased of the switch destination.
Step 2: Turn off the unidirectional switch to be forward biased of the switch source.
Step 3: Turn on the unidirectional switch to be forward biased of the switch destination.
Step 4: Turn off the unidirectional switch to be reversely biased of the switch source.

In the unidirectional switch Sio, a state in which the input voltage is lower than the output voltage is referred to as a reverse bias, and a state in which the input voltage is higher than the output voltage is referred to as a forward bias. In the unidirectional switch Soi, the state in which the input voltage is lower than the output voltage is referred to as the forward bias, and the state in which the input voltage is higher than the output voltage is referred to as the reverse bias.

Figure 16:
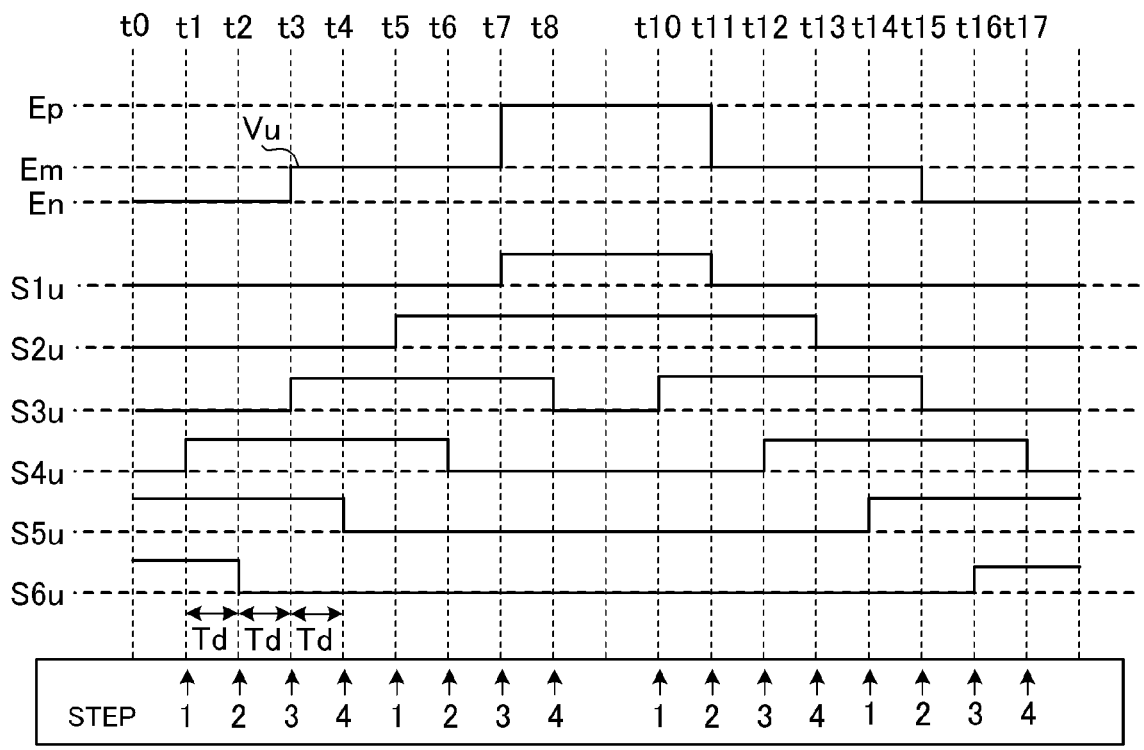
FIG. 16 is a diagram showing a relationship among the output phase voltage, the gate signal, and each step of the commutation operation in a four-step voltage commutation operation.

FIG. 16 is a diagram showing a relationship among the output phase voltage Vu, the gate signals S1u to S6u, and each step of the commutation operation in the four-step voltage commutation operation. In this voltage commutation operation, the switching pattern is the same between positive and negative polarities of the output phase current Iu.

Figure 17A:
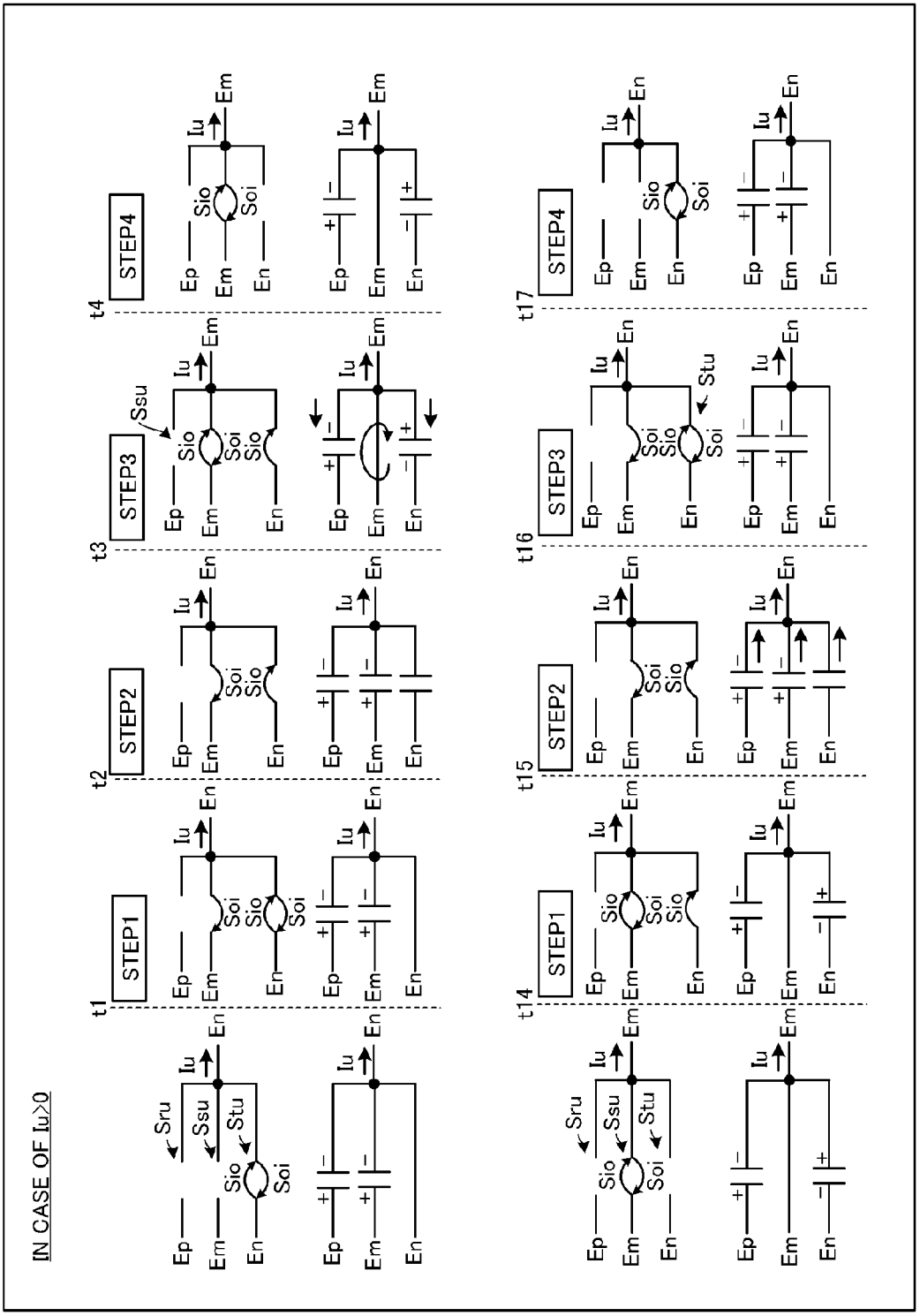
FIG. 17A is a diagram showing a relationship between the state of the bidirectional switch shown in FIG. 16 and the flow of electric charge due to the parasitic capacitance in the case where the output phase current is positive.
Figure 17B:
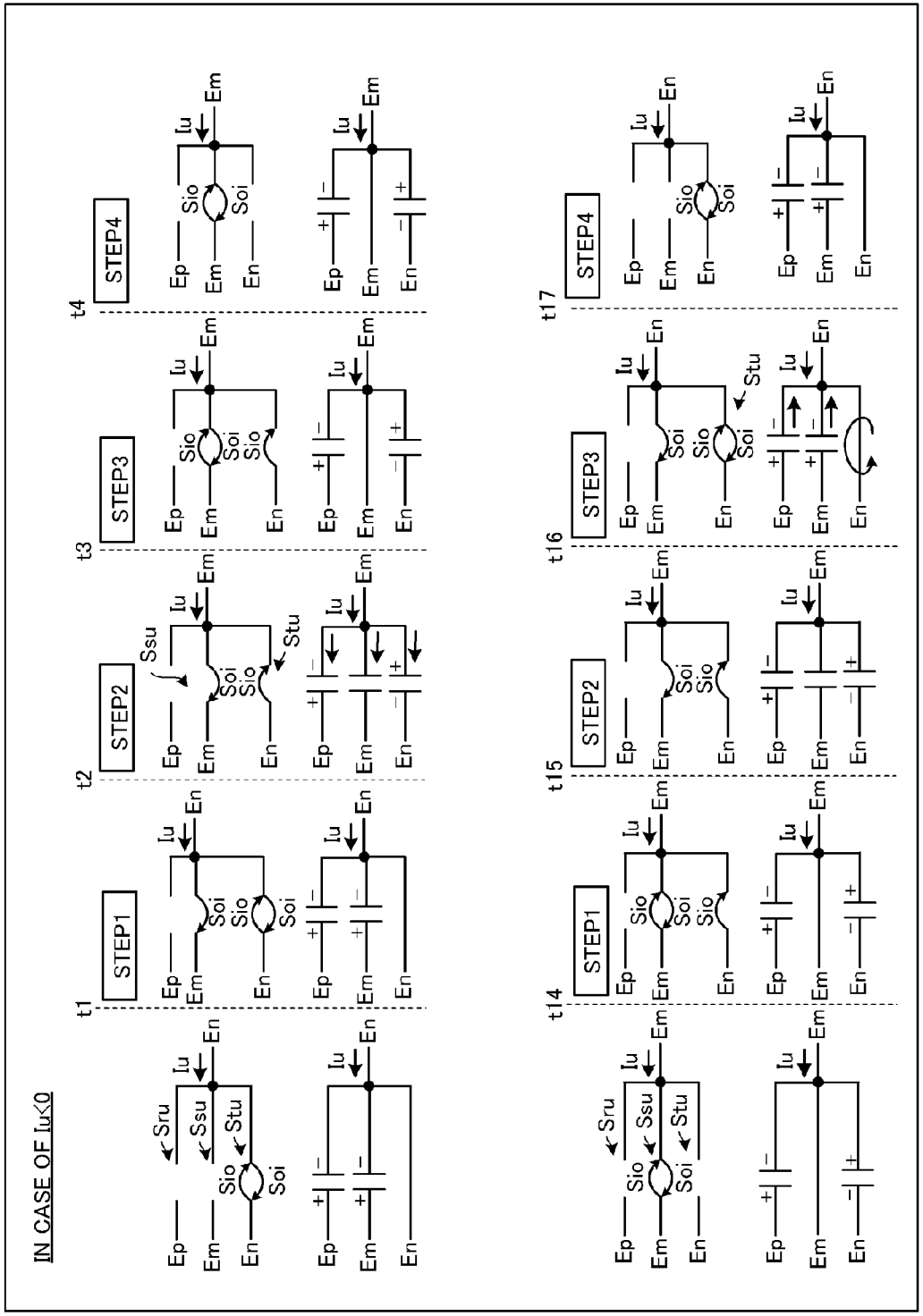
FIG. 17B is a diagram showing a relationship between the state of the bidirectional switch shown in FIG. 16 and the flow of electric charge due to the parasitic capacitance in the case where the output phase current is negative.

FIG. 17A and FIG. 17B are diagrams showing relationships between states of the bidirectional switch S at the time points t1 to t4 and t14 to t17 shown in FIG. 16 and the flow of electric charge due to the parasitic capacitance Cp. FIG. 17A shows the relationship in the case where the output phase current Iu is positive, and FIG. 17B shows the relationship in the case where the output phase current Iu is negative.

As shown in FIG. 16 and FIG. 17A, in the case where the output phase current Iu is positive, when the input phase connected to the output phase is switched from the high voltage phase to the low voltage phase, the output phase voltage Vu receives an influence of the parasitic capacitance Cp (between t15 and t16). In addition, as shown in FIG. 16 and FIG. 17B, in the case where the output phase current Iu is negative, when the input phase connected to the output phase is switched from the low voltage phase to the high voltage phase, the output phase voltage Vu receives an influence of the parasitic capacitance Cp (between t2 and t3).

Therefore, also in the case of the four-step voltage commutation operation, by performing the same compensation process for the parasitic capacitance Cp as the case of the four-step current commutation operation, distortion of the output voltage Vo or the output current Io can be reduced.

Figure 18A:
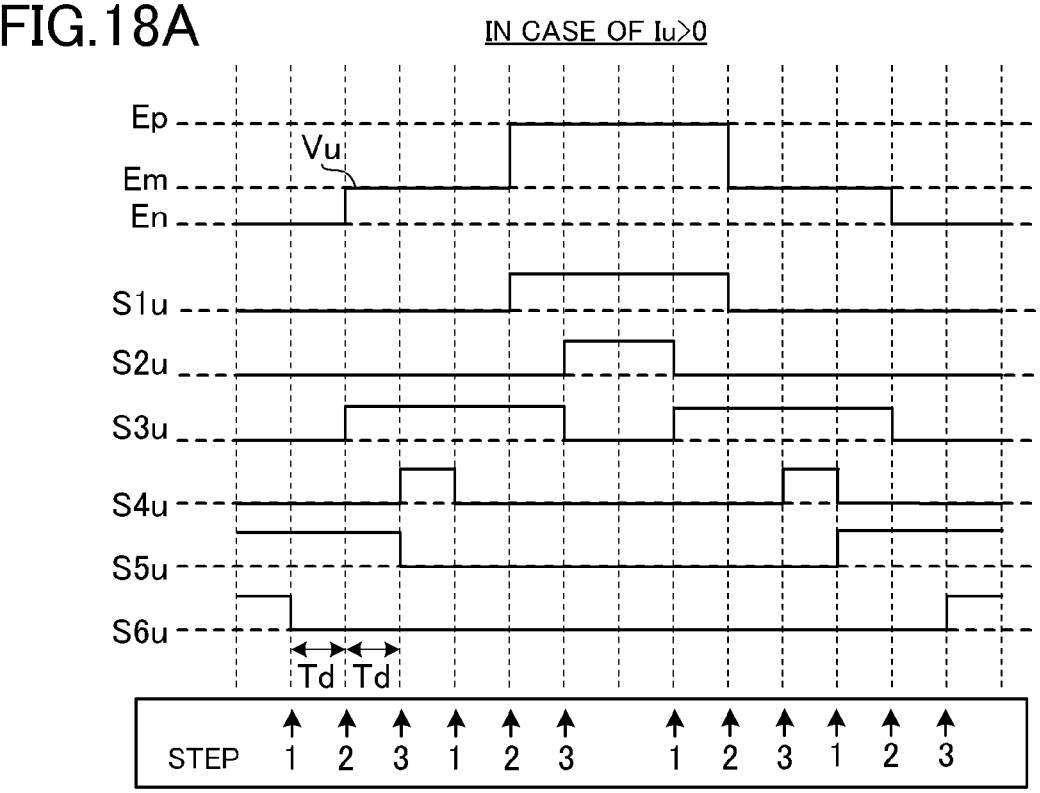
FIG. 18A is a diagram showing a relationship among the output phase voltage, the gate signal, and each step of the commutation operation in a case where the output phase current is positive in a three-step current commutation operation.
Figure 18B:
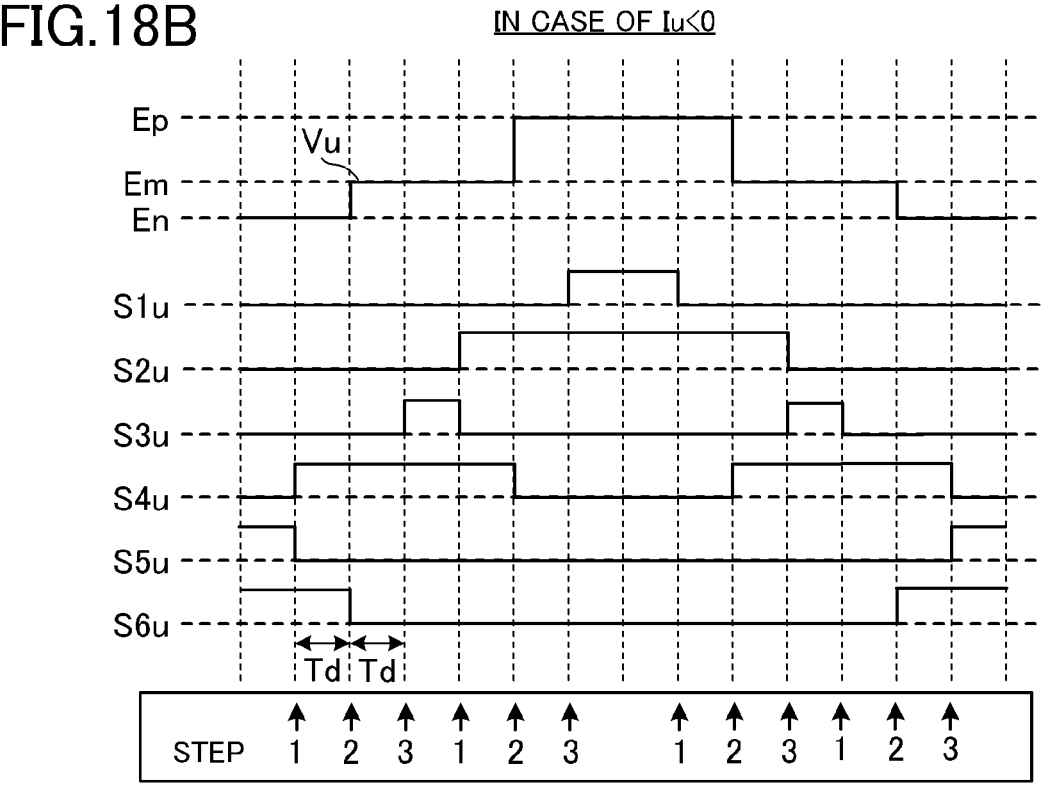
FIG. 18B is a diagram showing a relationship among the output phase voltage, the gate signal, and each step of the commutation operation in a case where the output phase current is negative in the three-step current commutation operation.

In addition, in the case of the three-step commutation operation, similarly to the four-step commutation operation, there are the voltage commutation and the current commutation. FIG. 18A and FIG. 18B are diagrams showing relationships among the output phase voltage Vu, the gate signals S1u to S6u, and each step of the commutation operation in the three-step current commutation operation. FIG. 18A shows the relationship in the case where the output phase current Iu is positive, and FIG. 18B shows the relationship in the case where the output phase current Iu is negative.

As shown in FIG. 18A and FIG. 18B, the three-step current commutation operation performs Step 1 and Step 2 simultaneously as one step or performs Step 3 and Step 4 simultaneously as one step in the four-step current commutation operation.

Specifically, in the case where the output phase current Iu is positive, when the input phase connected to the U phase is switched from the low voltage phase to the high voltage phase, Step 3 and Step 4 in the four-step current commutation operation corresponding to Step 3 of FIG. 18A are performed simultaneously in Step 3 shown in FIG. 18A (see FIG. 6A). In addition, when the input phase connected to the U phase is switched from the high voltage phase to the low voltage phase, Step 1 and Step 2 in the four-step current commutation operation corresponding to Step 1 of FIG. 18A are performed simultaneously in Step 1 shown in FIG. 18A (see FIG. 6A).

Further, in the case where the output phase current Iu is negative, when the input phase connected to the U phase is switched from the low voltage phase to the high voltage phase, Step 1 and Step 2 in the four-step current commutation operation corresponding to Step 1 of FIG. 18B are performed simultaneously in Step 1 shown in FIG. 18B (see FIG. 6B). In addition, when the input phase connected to the U phase is switched from the high voltage phase to the low voltage phase, Step 3 and Step 4 in the four-step current commutation operation corresponding to Step 3 of FIG. 18B are performed simultaneously in Step 3 shown in FIG. 18B (see FIG. 6B).

On the other hand, in the three-step current commutation operation, when the input phase connected to the U phase is switched from the high voltage phase to the low voltage phase, Step 3 in the four-step current commutation operation for positive Iu corresponds to Step 2. In addition, when the input phase connected to the U phase is switched from the low voltage phase to the high voltage phase, Step 3 in the four-step current commutation operation for negative Iu corresponds to Step 2. Therefore, also in the case of the three-step current commutation operation, by performing the same compensation process for the parasitic capacitance Cp as the case of the four-step current commutation operation, distortion of the output voltage Vo or the output current Io can be reduced.

Figure 19A:
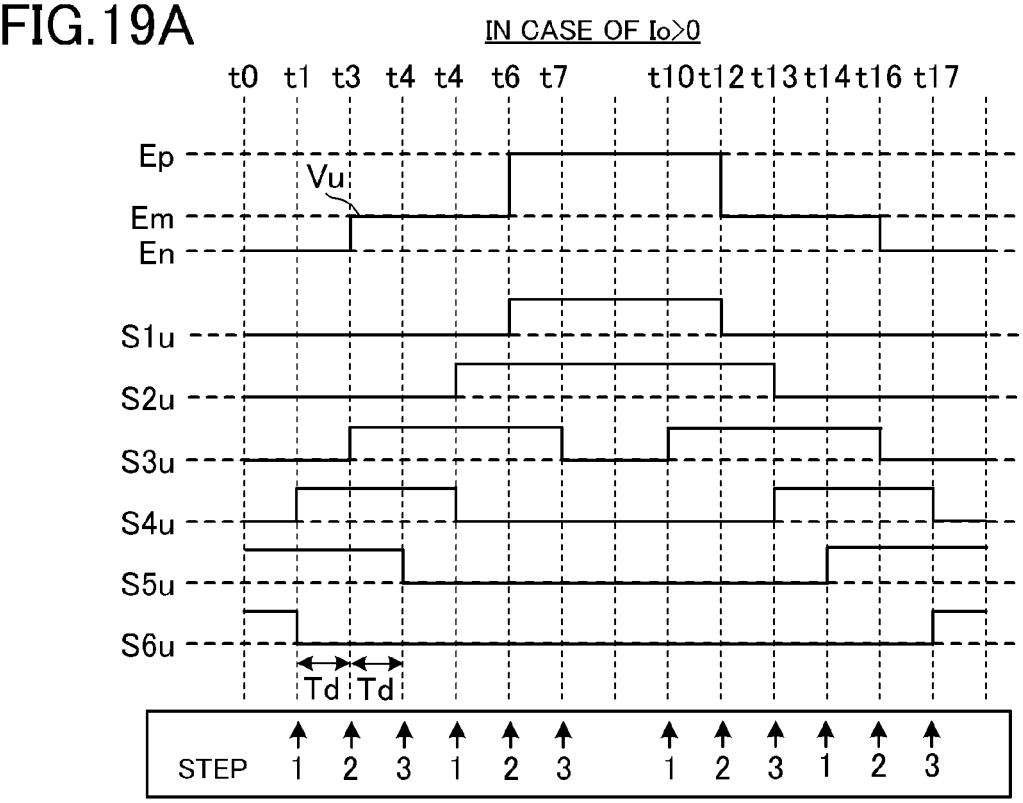
FIG. 19A is a diagram showing a relationship among the output phase voltage, the gate signal, and each step of the commutation operation in a case where the output phase current is positive in a three-step voltage commutation operation.
Figure 19B:
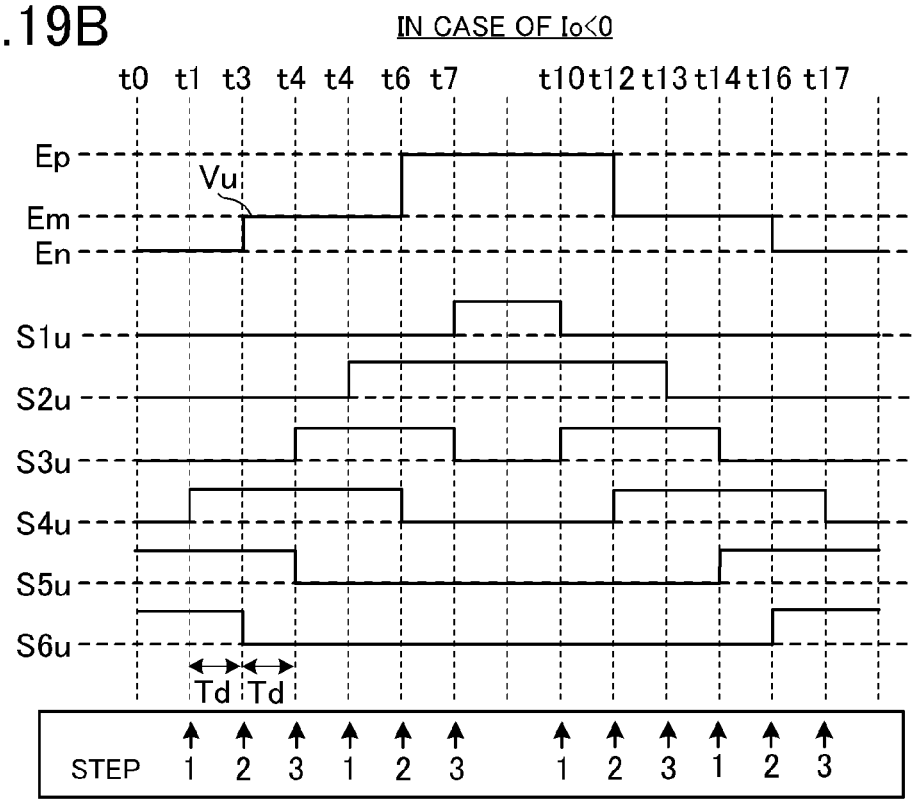
FIG. 19B is a diagram showing a relationship among the output phase voltage, the gate signal, and each step of the commutation operation in a case where the output phase current is negative in the three-step voltage commutation operation.

FIG. 19A and FIG. 19B are diagrams showing relationships among the output phase voltage Vu, the gate signals S1u to S6u, and each step of the commutation operation in a three-step voltage commutation operation. FIG. 19A shows the relationship in the case where the output phase current Iu is positive, and FIG. 19B shows the relationship in the case where the output phase current Iu is negative.

As shown in FIG. 19A and FIG. 19B, the three-step voltage commutation operation performs Step 1 and Step 2 in the four-step voltage commutation operation simultaneously as one step or performs Step 3 and Step 4 in the four-step voltage commutation operation simultaneously as one step.

Specifically, in the case where the output phase current Iu is positive, when the input phase connected to the U phase is switched from the low voltage phase to the high voltage phase, Step 1 and Step 2 in the four-step voltage commutation operation corresponding to Step 1 of FIG. 19A are performed simultaneously in Step 1 shown in FIG. 19A (see FIG. 16). In addition, when the input phase connected to the U phase is switched from the high voltage phase to the low voltage phase, Step 3 and Step 4 in the four-step voltage commutation operation corresponding to Step 3 of FIG. 19A are performed simultaneously in Step 3 shown in FIG. 19A (see FIG. 16).

Further, in the case where the output phase current Iu is negative, when the input phase connected to the U phase is switched from the low voltage phase to the high voltage phase, Step 3 and Step 4 in the four-step voltage commutation operation corresponding to Step 3 of FIG. 19B are performed simultaneously in Step 3 shown in FIG. 19B (see FIG. 16). In addition, when the input phase connected to the U phase is switched from the high voltage phase to the low voltage phase, Step 1 and Step 2 in the four-step voltage commutation operation corresponding to Step 1 of FIG. 19B are performed simultaneously in Step 1 shown in FIG. 19B (see FIG. 16).

On the other hand, in the three-step voltage commutation operation, when the input phase connected to the U phase is switched from the high voltage phase to the low voltage phase, Step 2 in the four-step voltage commutation operation for positive Iu corresponds to Step 2. In addition, when the input phase connected to the U phase is switched from the low voltage phase to the high voltage phase, Step 2 in the four-step voltage commutation operation for negative Iu corresponds to Step 2. Therefore, also in the case of the three-step voltage commutation operation, by performing the same compensation process for the parasitic capacitance Cp as the case of the four-step voltage commutation operation, distortion of the output voltage Vo or the output current Io can be reduced.

Next, the parasitic capacitance adjustment process is described. In the matrix converter 1 according to this embodiment, as described above, the value of the parasitic capacitance Cp can be determined by the parasitic capacitance adjustment process.

Figure 20A:
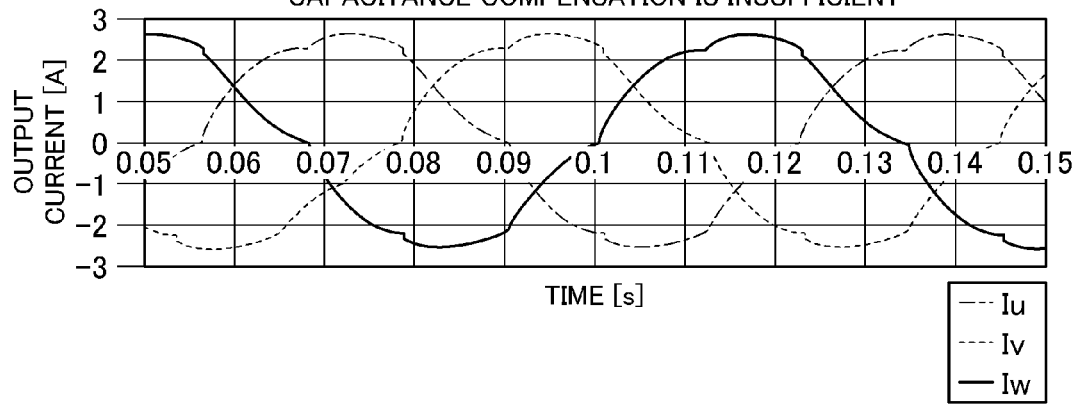
FIG. 20A is a graph showing a waveform example of the output current in a case where the parasitic capacitance is insufficiently compensated.
Figure 20B:
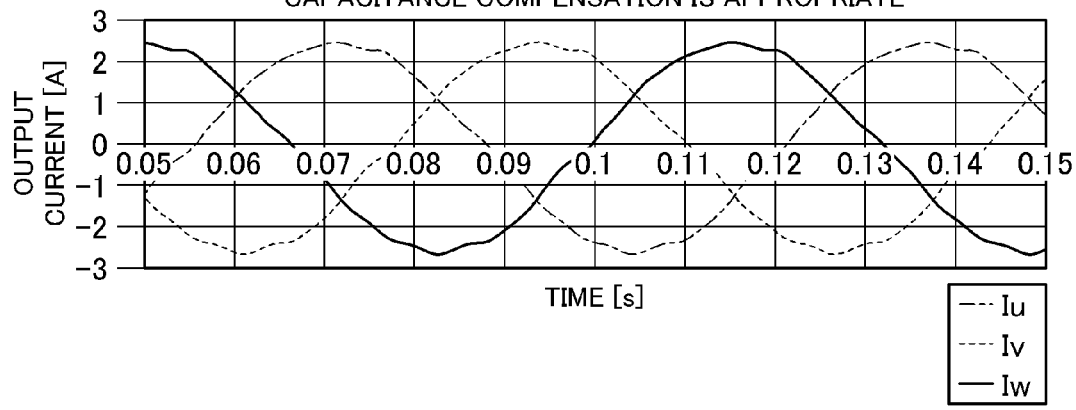
FIG. 20B is a graph showing a waveform example of the output current in a case where the parasitic capacitance is appropriately compensated.
Figure 20C:
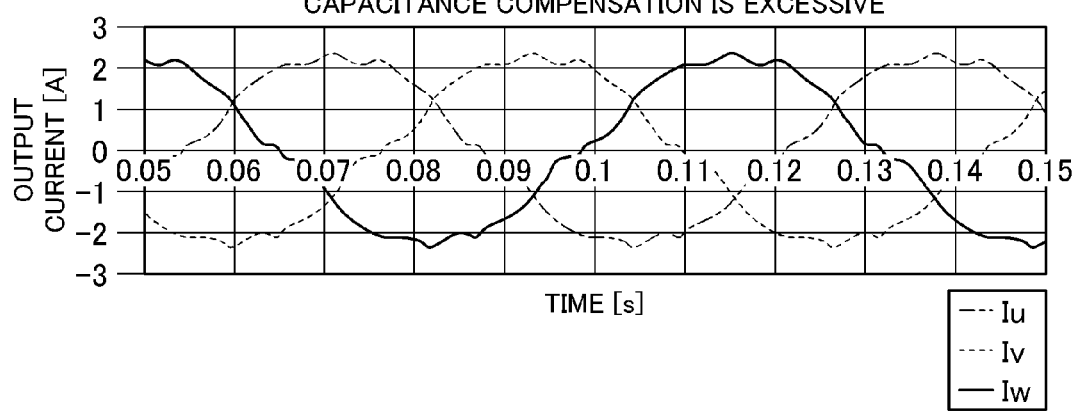
FIG. 20C is a graph showing a waveform example of the output current in a case where the parasitic capacitance is excessively compensated.

FIG. 20A is a graph showing a waveform example of the output current Io (Iu, Iv, and Iw) in a case where the parasitic capacitance compensation is insufficient, FIG. 20B is a graph showing a waveform example of the output current Io in a case where the parasitic capacitance compensation is appropriate, and FIG. 20C is a graph showing a waveform example of the output current Io in a case where the parasitic capacitance compensation is excessive.

As shown in FIG. 20A and FIG. 20C, in the case where the parasitic capacitance compensation is excessive, distortion of the output current Io is large similarly to the case where the parasitic capacitance compensation is insufficient. Therefore, it is desired to appropriately perform the parasitic capacitance compensation. The adjustment of the parasitic capacitance compensation can be performed by increasing or decreasing a set value of the parasitic capacitance Cp used for the parasitic capacitance compensation (hereinafter referred to as a parasitic capacitance value Cp^). Therefore, it is possible to estimate that the parasitic capacitance value Cp^ obtained when the parasitic capacitance compensation becomes appropriate by increasing or decreasing the parasitic capacitance value Cp^ is the value of the parasitic capacitance Cp.

Figure 21:
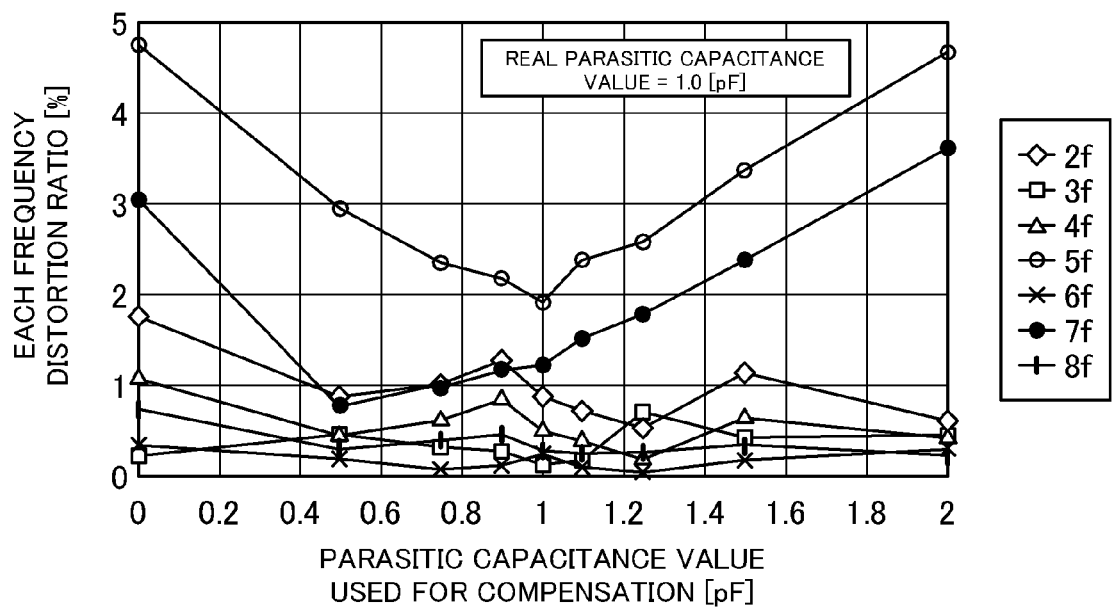
FIG. 21 is a graph showing increase and decrease characteristics of a specific frequency component included in the output current when a set value of the parasitic capacitance is increased and decreased.

FIG. 21 is a graph showing increase and decrease characteristics of specific frequency components contained in the output current Io when the parasitic capacitance value Cp^ is increased and decreased, and shows distortion characteristics of the second to eighth frequency components of a fundamental frequency f (for example, 50 Hz) in the output current Io. As shown in FIG. 21, it is understood that the fifth and seventh frequencies of the fundamental frequency f in the output current Io have large influences.

Figure 22:
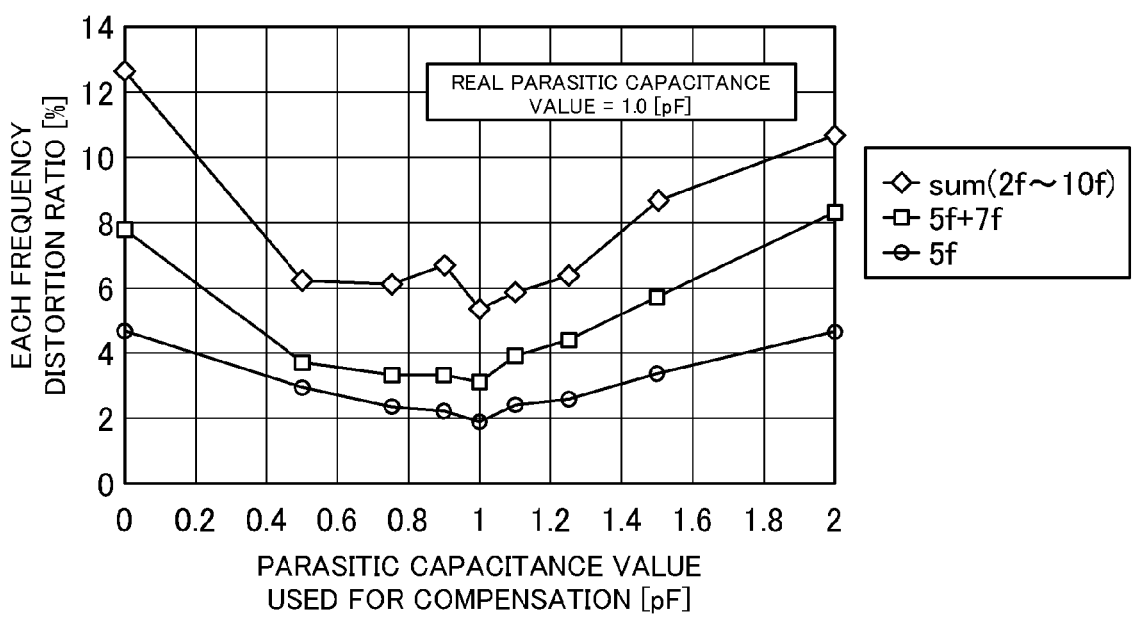
FIG. 22 is a graph showing increase and decrease characteristics of a total value of the specific frequency components included in the output current when the set value of the parasitic capacitance is increased and decreased.

FIG. 22 is a graph showing increase and decrease characteristics of a total frequency component (distortion) of the fifth and seventh frequencies of the fundamental frequency f, increase and decrease characteristics of a total frequency component (distortion) of the second to tenth frequencies of the fundamental frequency f, and increase and decrease characteristics of the fifth frequency component (distortion) of the fundamental frequency f, in the output current Io in the case where the parasitic capacitance value Cp^ is increased and decreased. As understood from the characteristics shown in FIG. 21 and FIG. 22, it is possible to appropriately perform the parasitic capacitance compensation by adjusting the parasitic capacitance value Cp^ so that distortion of the output phase current becomes smallest, or so that the fifth frequency component of the fundamental frequency f or the total value of specific frequency components such as the fifth and seventh frequency components (distortion) of the fundamental frequency f becomes smallest.

Therefore, the controller 14 determines the parasitic capacitance value Cp^ at which the distortion of the output current Io or the total value of the specific frequency components, for example, the total value of the fifth and seventh frequency components of the fundamental frequency f becomes smallest, and estimates a true parasitic capacitance value Cp. Then, the controller 14 performs the parasitic capacitance compensation by using the estimated parasitic capacitance value Cp^. Now, an example of the process of estimating the parasitic capacitance value Cp^ is described below. Note that, it is possible to perform the process of estimating the true parasitic capacitance value Cp by using a waveform shape of the output voltage Vo (for example, rising or falling time) instead of using the distortion of the output current Io.

When the matrix converter 1 is manufactured, a fundamental value Cp^0 of the parasitic capacitance Cp is set in advance. The fundamental value Cp^0 is set to two times the average value of the parasitic capacitance Cp measured in the past, for example. Note that, it is possible to determine the fundamental value Cp^0 from the distortion of the output current Io. In addition, the fundamental value Cp^0 may be determined from a waveform shape of a smoothly-changing part of the output voltage waveforms of the output terminals Tu, Tv, and Tw.

After that, when the load 3 is connected to the matrix converter 1 as installation, tuning of the parasitic capacitance value Cp^ (hereinafter referred to as parasitic capacitance tuning) is performed. In the parasitic capacitance tuning, the controller 14 supplies the load 3 with a three-phase AC voltage from the power converter 10 in response to the frequency command f* of a constant low frequency (for example, 10 Hz). An amplitude value of the output voltage Vo is determined by a V/f control, for example.

In the parasitic capacitance tuning, the controller 14 changes the parasitic capacitance value Cp^ to be used in the parasitic capacitance compensation within the range of 0 [F] to the fundamental value Cp^0 [F]. For instance, after setting the parasitic capacitance value Cp^ to 0 [F], the parasitic capacitance value Cp^ is gradually increased step by step, and this increasing process is continued up to the fundamental value Cp^0 [F] as the upper limit.

The controller 14 obtains the output current Io from the output current detector 13 during a period of an integral multiple of the frequency command f* every time when changing the parasitic capacitance value Cp^ in the parasitic capacitance tuning. After changing the parasitic capacitance value Cp^, the controller 14 obtains the output current Io in a state where the output current Io becomes a stable waveform.

The controller 14 extracts a specific frequency component from the obtained output current Io so as to determine distortion of the output current Io. For instance, the controller 14 extracts the fifth and seventh frequency components of the frequency command f* as the specific frequency component, and determines a value corresponding to an amplitude of the extracted component as the distortion of the output current Io. Note that, the controller 14 extracts the specific frequency component by using a fast Fourier transform (FFT) filter or a band-pass filter, for example.

The controller 14 stores the distortion of the output current Io determined every time when changing the parasitic capacitance value Cp^ in an internal memory (not shown). Thus, distortions of the output current Io in the range of from 0 [F] to the fundamental value Cp^0 [F] are stored in the memory of the controller 14. The controller 14 determines the parasitic capacitance value Cp^ having the smallest distortion among the distortions of the output current Io stored in the memory, and sets the determined parasitic capacitance value Cp^ as the parasitic capacitance value Cp^ to be used for the parasitic capacitance compensation.

In this way, in the matrix converter 1 according to this embodiment, the parasitic capacitance value Cp^ with the smallest distortion of the output phase current is determined, and the parasitic capacitance compensation is performed by using the parasitic capacitance value Cp^ adjusted by the tuning. Therefore, compared with a case where the parasitic capacitance value Cp^ is manually adjusted, it is possible to significantly reduce a burden of adjustment. Note that, the controller 14 may perform the process of adjusting the parasitic capacitance value Cp^ regularly (for example, once a month). In addition, the adjustment process may be performed when the matrix converter 1 is started.

In addition, when the matrix converter 1 is equipped with an output voltage detector for detecting the output phase voltages Vu, Vv, and Vw at the output terminals Tu, Tv, and Tw, the controller 14 can also determine the value of the parasitic capacitance Cp from waveforms of the output phase voltages Vu, Vv, and Vw detected by the output voltage detector. For instance, the controller 14 determines the charge and discharge time $\Delta t$ of the electric charge accumulated in the parasitic capacitance for each output phase based on a rising or falling waveform of the output phase voltages Vu, Vv, and Vw, and determines the value of the parasitic capacitance Cp from the charge and discharge time $\Delta t$, the output phase currents Iu, Iv, and Iw, and the output phase voltages Vu, Vv, and Vw for each output phase, by using a predetermined calculation expression. Note that, the predetermined calculation expression is obtained by modifying the expression (4), and is Cp=$\Delta t \times$Io/3Vp, for example.

(Second Embodiment)

Next, a matrix converter according to a second embodiment is described. In the matrix converter 1 according to the first embodiment, the step interval Td is the same period in respective steps (the same period is set for convenience of description, but it is not necessary to be the same in practice). In contrast, in the matrix converter according to the second embodiment, the step period is changed for respective steps.

Now, with reference to FIGS. 23 to 29, the matrix converter according to the second embodiment is specifically described below. A structural element corresponding to the structural element of the first embodiment described above is denoted by the same numeral or symbol, and description overlapping with the first embodiment is appropriately omitted.

Figure 23:
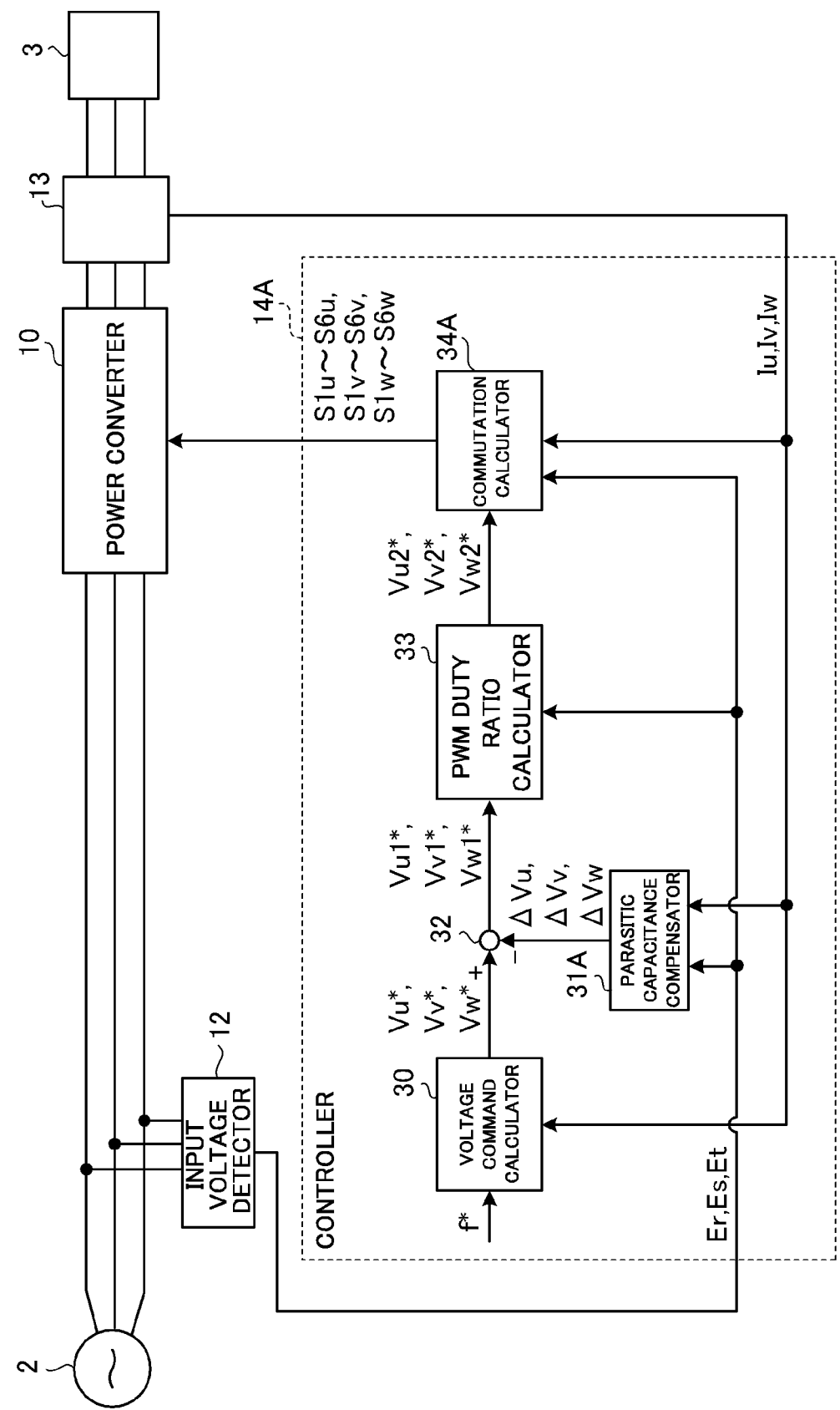
FIG. 23 is a diagram illustrating a structure of a matrix converter according to a second embodiment.

FIG. 23 is a diagram illustrating a structure of the matrix converter according to the second embodiment. As illustrated in FIG. 23, a controller 14A of a matrix converter 1A according to the second embodiment includes the voltage command calculator 30, a parasitic capacitance compensator 31A (an example of the compensator), the subtractor 32, the PWM duty ratio calculator 33, and a commutation calculator 34A (an example of the commutation controller).

The commutation calculator 34A generates the gate signals S1$u$ to S6$u$, S1$y$ to S6$v$, and S1$w$ to S6$w$ to which the four-step current commutation operation is added. Now, a relationship among the gate signals S1$u$ to S6$u$, the output phase voltage Vu, and Steps 1 to 4 of the commutation operation is described below as an example. As to the gate signals S1$v$ to S6$v$ and S1$w$ to S6$w$, the same relationship as the gate signals S1$u$ to S6$u$ is satisfied.

FIG. 24A and FIG. 24B are diagrams showing the relationship among the output phase voltage Vu, the gate signals S1$u$ to S6$u$, and Steps 1 to 4 of the commutation operation. FIG. 24A shows the relationship in the case where the output phase current Iu is positive, and FIG. 24B shows the relationship in the case where the output phase current Iu is negative.

In the case where the output phase current Iu is positive, as shown in FIG. 24A, the commutation calculator 34A sets a step interval between Step 1 and Step 2 to Td1+Td2, a step interval between Step 2 and Step 3 to Td2, and a step interval between Step 3 and Step 4 to Td1, when commutating the input phase connected to the U phase from the low voltage phase to the high voltage phase. In addition, when commutating the input phase connected to the U phase from the high voltage phase to the low voltage phase, the commutation calculator 34A sets the step interval between Step 1 and Step 2 to Td1, the step interval between Step 2 and Step 3 to Td2, and the step interval between Step 3 and Step 4 to Td1+Td2.

In the case where the output phase current Iu is negative, when commutating the input phase connected to the U phase from the low voltage phase to the high voltage phase, the commutation calculator 34A sets the step interval between Step 1 and Step 2 to Td3, the step interval between Step 2 and Step 3 to Td2, and the step interval between Step 3 and Step 4 to Td2+Td3. In addition, when commutating the input phase connected to the U phase from the high voltage phase to the low voltage phase, the commutation calculator 34A sets the step interval between Step 1 and Step 2 to Td2+Td3, the step interval between Step 2 and Step 3 to Td2, and the step interval between Step 3 and Step 4 to Td3.

In this way, by changing the setting of each interval between steps in accordance with the polarity of the output phase current Iu, it is possible to prevent occurrence of a voltage error generated by the switching pattern of the commutation in the PWM period (see International Patent W02008/108147A). The step intervals Td1 and Td3 are set to the turn-off time of the unidirectional switches Sio and Soi or longer, and the step interval Td2 is set to the turn-on time of the unidirectional switches Sio and Soi or longer.

The switching patterns shown in FIG. 24A and FIG. 24B are the same as the switching patterns according to the first embodiment shown in FIG. 6A and FIG. 6B except for the step interval. Therefore, the parasitic capacitance Cp affects the output voltage.

Figure 25:
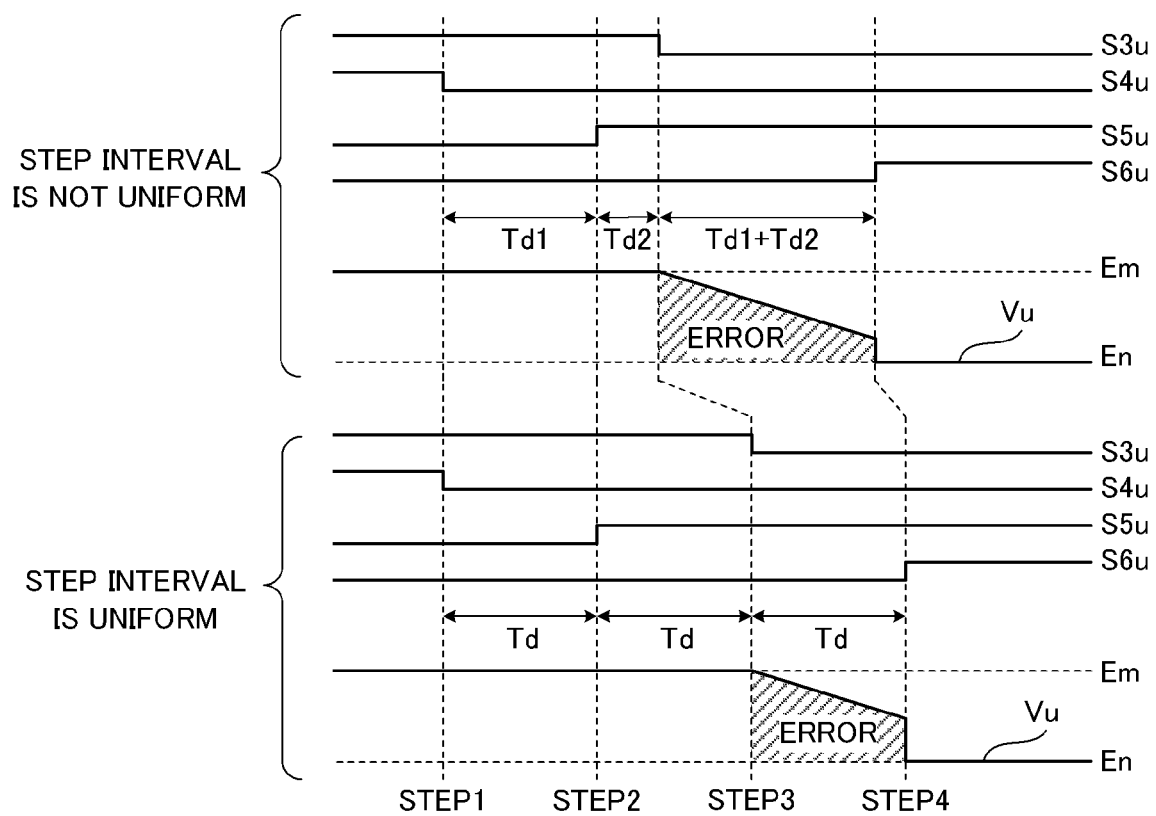
FIG. 25 is a diagram showing the output voltage error due to the parasitic capacitance in a case where a step interval is uniform (first embodiment) and the output voltage error due to the parasitic capacitance in a case where the step interval is not uniform (second embodiment) in the four-step current commutation operation.

FIG. 25 is a diagram showing an output voltage error in a case where the step interval is uniform as in the matrix converter 1 of the first embodiment (the step interval is uniform for convenience of description, but it is not necessary to be uniform in practice), and an output voltage error in a case where the step interval is not uniform as in the matrix converter 1A of the second embodiment. As shown in FIG. 25, in the matrix converter 1A of the second embodiment, in the case where the output phase current Iu is positive, an output voltage error occurs in the step interval (Td1+Td2) when the input phase connected to the U output phase is commutated from the high voltage phase to the low voltage phase. In addition, though not shown, in the case where the output phase current Iu is negative, an output voltage error occurs in the step interval (Td2+Td3) when the input phase connected to the U output phase is commutated from the low voltage phase to the high voltage phase.

Therefore, in the matrix converter 1A of the second embodiment, compared with the case of the matrix converter 1 of the first embodiment, a period in which the parasitic capacitance Cp affects the output voltage becomes longer, and hence the output voltage error due to the parasitic capacitance Cp increases. The same is true in the V phase and the W phase other than the U phase.

Figure 26:
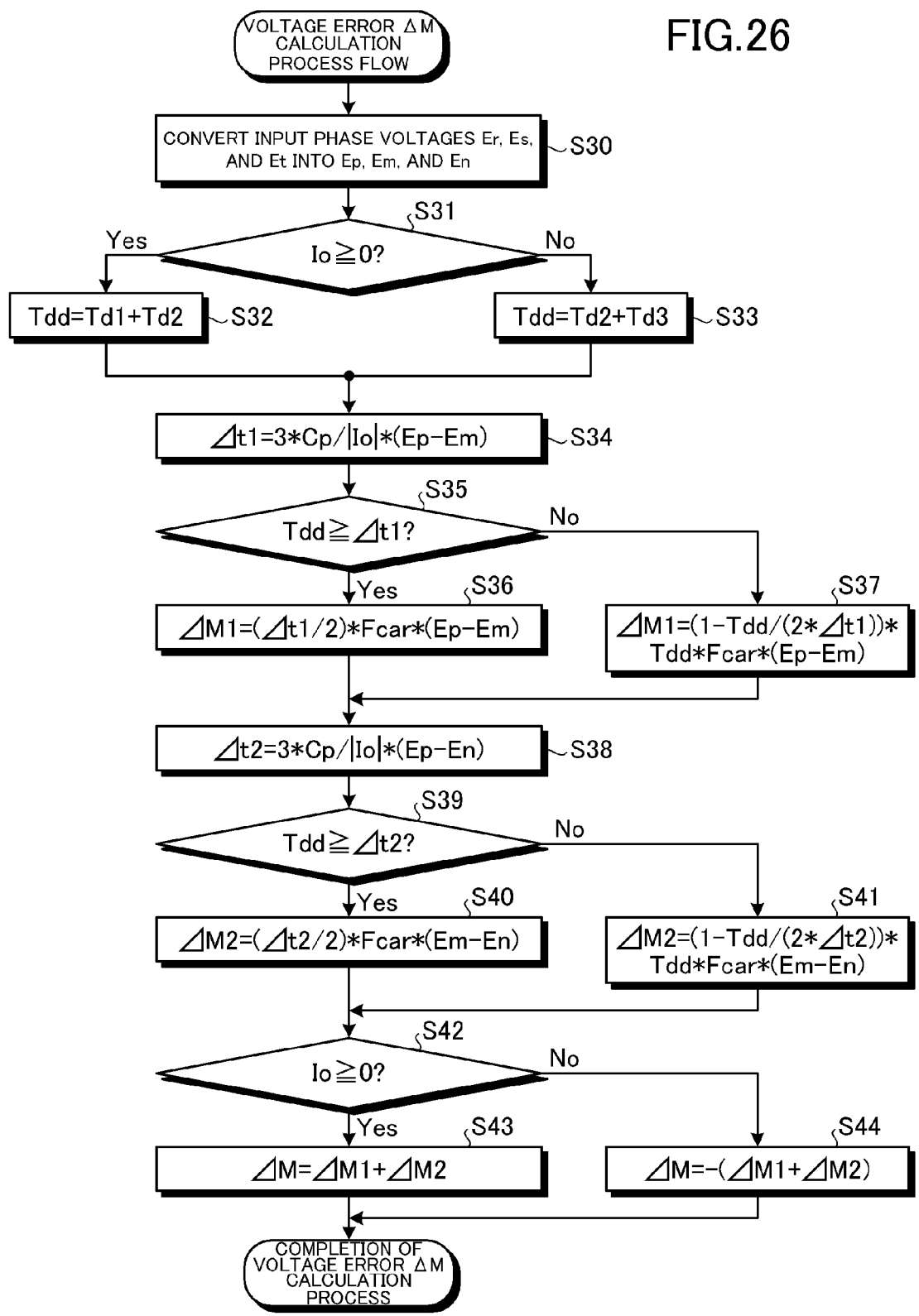
FIG. 26 is a diagram illustrating an example of a calculation process flow of the voltage error performed by the parasitic capacitance compensator in the four-step current commutation operation.

Therefore, in the parasitic capacitance compensator 31A, the step interval to be compared with the charge and discharge time $\Delta t1$ or $\Delta t2$ is changed in accordance with the polarity of the output current Io. FIG. 26 is a diagram illustrating an example of the calculation process flow of the voltage error $\Delta M$ performed by the parasitic capacitance compensator 31A in the four-step current commutation operation.

As illustrated in FIG. 26, when starting the calculation process of the voltage error $\Delta M$ for each output phase, the parasitic capacitance compensator 31A first converts the input phase voltages Er, Es, and Et into the input phase voltages Ep, Em, and En (Step S30). Next, the parasitic capacitance compensator 31A determines whether or not the output current Io is positive (Step S31). When determining that the output current Io is positive (Yes in Step S31), the parasitic capacitance compensator 31A sets Td1+Td2 as a step interval Tdd (Step S32). On the other hand, when determining that the output current Io is negative (No in Step S31), the parasitic capacitance compensator 31A sets Td2+Td3 as the step interval Tdd (Step S33).

When the process of Steps S32 and S33 is finished, the parasitic capacitance compensator 31A performs a process corresponding to Steps S34 to S44 for each output phase. The process of Steps S34 to S44 is similar to the process of Steps S11 to S21 illustrated in FIG. 14. The process of Steps S35, S37, S39, and S41 corresponds to the process of Steps S12, S14, S16, and S18 in which the step interval Td is replaced with the step interval Tdd.

In this way, the matrix converter 1A according to the second embodiment sets each interval between steps in accordance with the polarity of the output current Io, thereby being capable of reducing the output voltage error due to the parasitic capacitance Cp while preventing the occurrence of the voltage error generated by the switching pattern of the commutation in the PWM period (see International Patent W02008/108147A).

In the embodiment described above, the four-step current commutation operation is described. However, the method of preventing the occurrence of the voltage error generated by the switching pattern of the commutation (see International Patent W02008/108147A) and the method of compensating for the output voltage error due to the parasitic capacitance Cp described above can be applied also to the four-step voltage commutation operation, or to the four-step commutation operation in which the current commutation and the voltage commutation are combined.

Figure 27A:
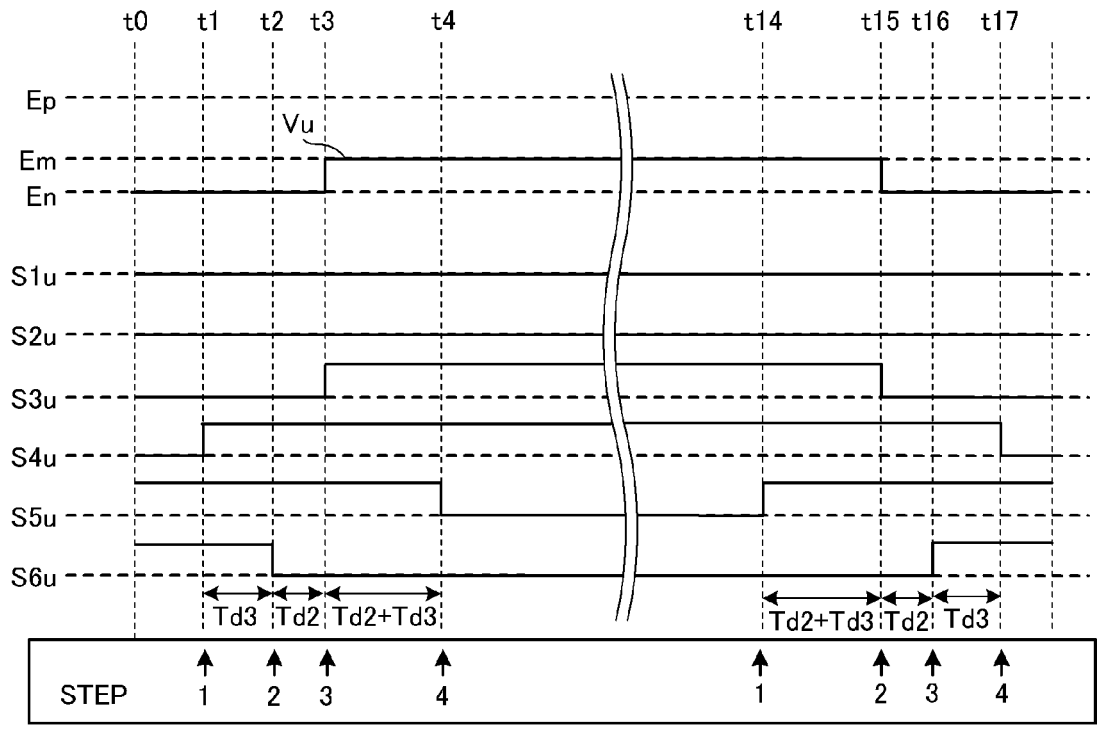
FIG. 27A is a diagram showing a relationship among the output phase voltage, the gate signal, and each step of the commutation operation in the case where the output phase current is positive in the four-step voltage commutation operation.
Figure 27B:
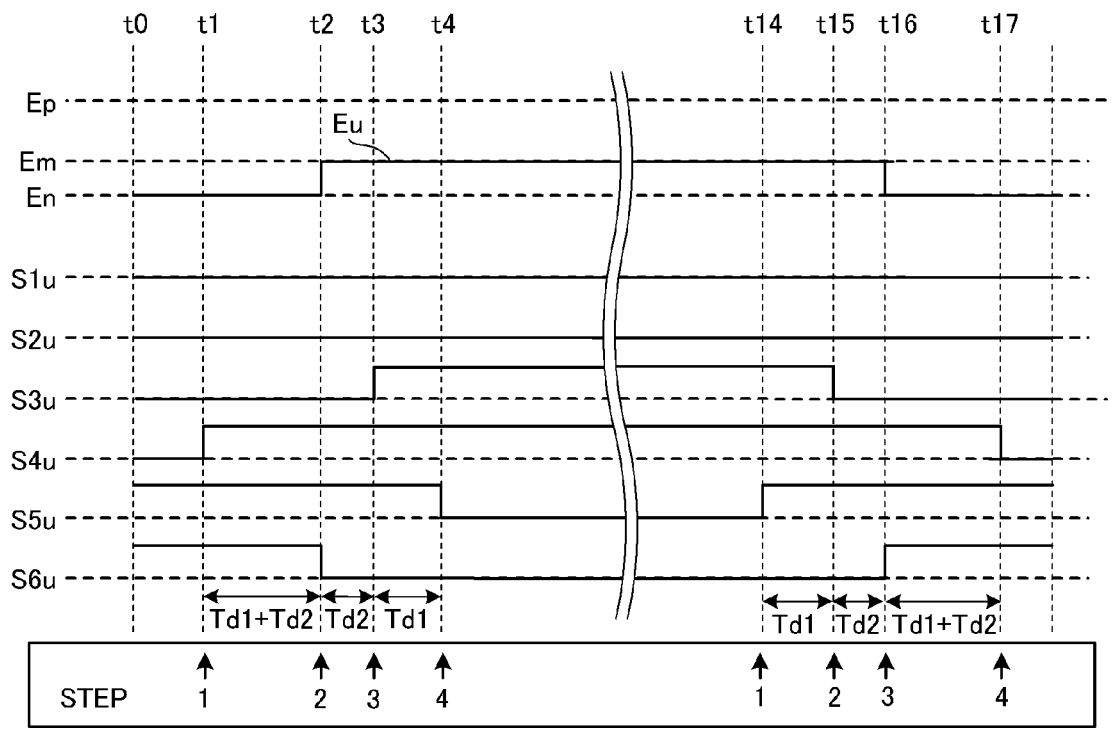
FIG. 27B is a diagram showing a relationship among the output phase voltage, the gate signal, and each step of the commutation operation in the case where the output phase current is negative in the four-step voltage commutation operation.

FIG. 27A and FIG. 27B are diagrams showing a relationship among the output phase voltage Vu, the gate signals S1$u$ to S6$u$, and Steps 1 to 4 of the commutation operation in the four-step voltage commutation operation. FIG. 27A shows the relationship in the case where the output phase current Iu is positive, and FIG. 27B shows the relationship in the case where the output phase current Iu is negative.

As shown in FIG. 27A, in the case where the output phase current Iu is positive, the commutation calculator 34A sets a step interval between Step 1 and Step 2 to Td3, a step interval between Step 2 and Step 3 to Td2, and a step interval between Step 3 and Step 4 to Td2+Td3, when commutating the input phase connected to the U phase from the low voltage phase to the high voltage phase. In addition, when commutating the input phase connected to the U phase from the high voltage phase to the low voltage phase, the commutation calculator 34A sets the step interval between Step 1 and Step 2 to Td2+Td3, the step interval between Step 2 and Step 3 to Td2, and the step interval between Step 3 and Step 4 to Td3.

As shown in FIG. 27B, in the case where the output phase current Iu is negative, when commutating the input phase connected to the U phase from the low voltage phase to the high voltage phase, the commutation calculator 34A sets the step interval between Step 1 and Step 2 to Td1+Td2, the step interval between Step 2 and Step 3 to Td2, and the step interval between Step 3 and Step 4 to Td1. In addition, when commutating the input phase connected to the U phase from the high voltage phase to the low voltage phase, the commutation calculator 34A sets the step interval between Step 1 and Step 2 to Td1, the step interval between Step 2 and Step 3 to Td2, and the step interval between Step 3 and Step 4 to Td1+Td2.

In this way, by changing the setting of each interval between steps in accordance with the polarity of the output phase current Iu, it is possible to prevent occurrence of a voltage error generated by the switching pattern of the commutation in the PWM period. The switching patterns shown in FIG. 27A and FIG. 27B are the same as the switching pattern according to the first embodiment shown in FIG. 16 except for the step interval. Therefore, similarly to the case of the four-step current commutation operation, the parasitic capacitance Cp affects the output voltage.

Figure 28:
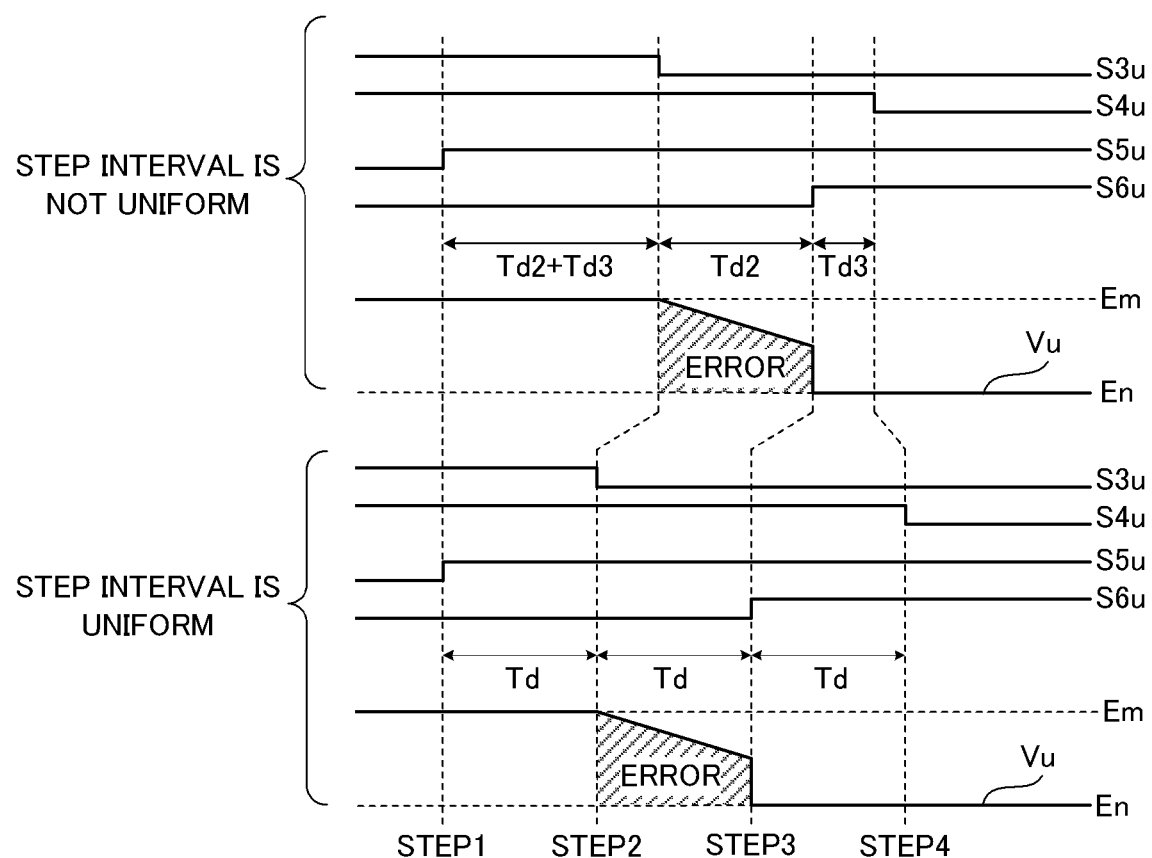
FIG. 28 is a diagram showing the output voltage error due to the parasitic capacitance in the case where the step interval is uniform (first embodiment) and the output voltage error due to the parasitic capacitance in the case where the step interval is not uniform (second embodiment) in the four-step voltage commutation operation.

FIG. 28 is a diagram showing an output voltage error in a case where the step interval is uniform as in the matrix converter 1 of the first embodiment (the step interval is uniform for convenience of description, but it is not necessary to be uniform in practice), and an output voltage error in a case where the step interval is not uniform as shown in FIG. 27A and FIG. 27B. As shown in FIG. 28, in the matrix converter 1A of the second embodiment, in the case where the output phase current Iu is positive, an output voltage error occurs in the step interval Td2 when the input phase connected to the U output phase is commutated from the high voltage phase to the low voltage phase. In addition, though not shown, in the case where the output phase current Iu is negative, an output voltage error occurs in the step interval Td2 when the input phase connected to the U output phase is commutated from the low voltage phase to the high voltage phase.

The step interval Td2 is set to a turn-off time Toff of the unidirectional switches Sio and Soi or longer. The step interval Td in the first embodiment is set to be longer than the turn-off time Toff and a turn-on time Ton of the unidirectional switches Sio and Soi. Therefore, when Ton>Toff holds, compared with the case of the first embodiment in which the step interval Td is uniform, the period in which the parasitic capacitance Cp affects the output voltage becomes shorter, and hence the output voltage error due to the parasitic capacitance Cp is decreased. On the other hand, when Ton<Toff holds, the period in which the parasitic capacitance Cp affects the output voltage becomes the same, and hence the influence of the parasitic capacitance Cp on the output voltage is the same as in the case of the first embodiment in which the step interval Td is uniform.

Figure 29:
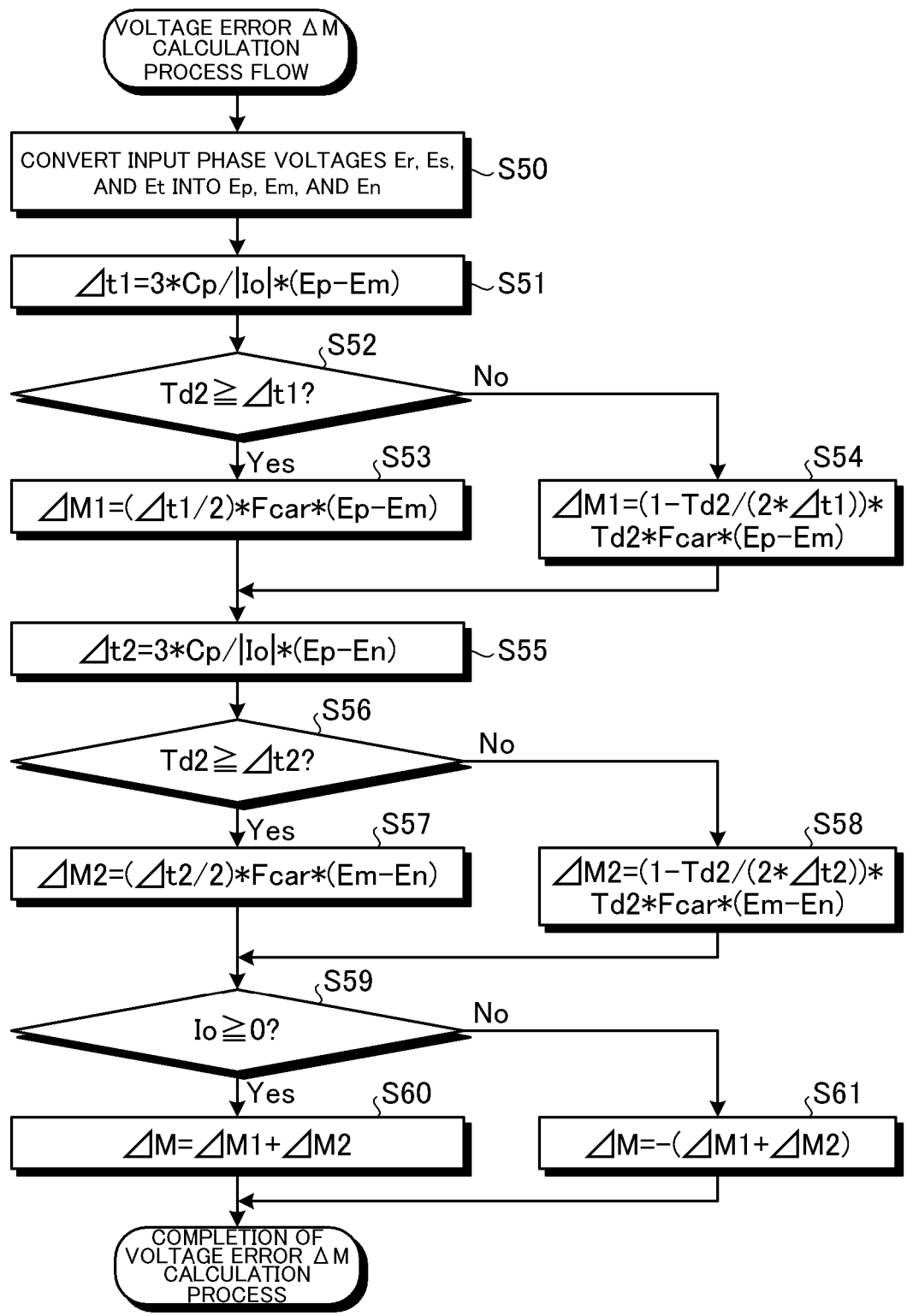
FIG. 29 is a diagram illustrating an example of the calculation process flow of the voltage error performed by the parasitic capacitance compensator in the four-step voltage commutation operation.

FIG. 29 is a diagram illustrating an example of the calculation process flow of the voltage error performed by the parasitic capacitance compensator 31A in the four-step voltage commutation operation. The process of Steps S50 to S61 illustrated in FIG. 29 is similar to the process of Steps S11 to S21 illustrated in FIG. 14. The process of Steps S52, S54, S56, and S58 corresponds to the process of Steps S12, S14, S16, and S18 in which the step interval Td is replaced with the step interval Td2.

In the second embodiment, each step interval between steps in the commutation operation is set to an appropriate interval, so as to correct the voltage error generated by the switching pattern of the commutation (see International Patent WO2008/108147A for this point). However, it is possible to use another method as long as the method can compensate for the voltage error generated by the switching pattern of the commutation. For instance, it is possible to adjust the voltage command or to adjust the PWM pulse width in accordance with the voltage error generated by the switching pattern of the commutation.

Further effects and modified examples can be easily derived by a person skilled in the art. Therefore, a wider range of aspects of the present disclosure is not limited by the specific, detailed, and typical embodiments described above. Therefore, various modifications can be performed without deviating from the spirit or scope of the general inventive concept defined by the attached claims and their equivalents.

It should be understood by those skilled in the art that various modifications, combinations, sub-combinations and alterations may occur depending on design requirements and other factors insofar as they are within the scope of the appended claims or the equivalents thereof.

What is claimed is:

1. A matrix converter, comprising:
   a power converter comprising:
      a plurality of bidirectional switches;
      a plurality of input terminals configured to be connected to phases of an AC power source; and
      a plurality of output terminals configured to be connected to phases of a load;
      wherein the plurality of bidirectional switches connect the plurality of input terminals and the plurality of output terminals to each other:
   a commutation controller configured to perform one of a three-step commutation operation and a four-step commutation operation by the plurality of bidirectional switches as a switch source and the plurality of bidirectional switches as a switch destination when the plurality of input terminals to be connected to the plurality of output terminals are switched by on/off control of the plurality of bidirectional switches; and
   a compensator configured to compensate for an output voltage error generated when the plurality of input terminals to be connected to the plurality of output terminals are switched, based on at least:
      a potential difference between a voltage at the plurality of input terminals before switching and a voltage at the plurality of output terminals after switching of the plurality of input terminals to be connected to the plurality of output terminals,
      an output current of the plurality of output terminals, and
      capacitance between input and output terminals of unidirectional switches included in the plurality of bidirectional switches.

2. The matrix converter according to claim 1, wherein the plurality of bidirectional switches are each comprise:
   a first unidirectional switch and a first diode,
   a second unidirectional switch and a second diode,
   wherein said first unidirectional switch and said first diode are in an anti-parallel configuration with said second unidirectional switch and said second diode.

3. The matrix converter according to claim 1, wherein the plurality of bidirectional switches are each configured by an anti-parallel connection of the unidirectional switches.

4. The matrix converter according to claim 1, wherein the compensator is configured to compensate for the output voltage error generated when the output current is positive and when the plurality of input terminals to be connected to the plurality of output terminals are switched from an input terminal connected to a high voltage phase to an input terminal connected to a low voltage phase, based on at least:
   a potential difference between the high voltage phase and the low voltage phase,
   the output current, and
   the capacitance.

5. The matrix converter according to claim 1, wherein the compensator is configured to compensate for the output voltage error generated when the output current is negative and when the plurality of input terminals to be connected to the plurality of output terminals are switched from an input terminal connected to a low voltage phase to an input terminal connected to a high voltage phase, based on at least:
- a potential difference between the high voltage phase and the low voltage phase,
- the output current, and
- the capacitance.

6. The matrix converter according to claim 1, wherein the compensator is configured to switch a method of calculating the output voltage error in accordance with whether or not a change of an output voltage of the plurality of output terminals due to the capacitance is completed in a step period in which the output voltage is changing due to the commutation operation.

7. The matrix converter according to claim 1, further comprising a calculator configured to perform one of measuring and adjusting of the capacitance,
wherein the compensator is configured to compensate for the output voltage error by using the capacitance calculated by the calculator.

8. The matrix converter according to claim 1, wherein said plurality of bidirectional switches consists of nine bidirectional switches.

9. The matrix converter according to claim 1, wherein said plurality of bidirectional switches comprises:
a first bidirectional switch, a second bidirectional switch, and a third bidirectional switch.

10. The matrix converter according to claim 9, wherein said plurality of bidirectional switches comprises:
a fourth bidirectional switch, a fifth bidirectional switch and a sixth bidirectional switch.

11. The matrix converter according to claim 10, wherein said plurality of bidirectional switches comprises:
a seventh bidirectional switch, an eighth bidirectional switch and a ninth bidirectional switch.

12. A matrix converter, comprising:
power converting means comprising:
a plurality of bidirectional switches
a plurality of input terminals configured to be connected to phases of an AC power source and
a plurality of output terminals configured to be connected to phases of a load,
wherein the plurality of bidirectional switches connect the plurality of input terminals and the plurality of output terminals to each other;
commutation controlling means configured to perform one of a three-step commutation operation and a four-step commutation operation by the plurality of bidirectional switches as a switch source and the plurality of bidirectional switches as a switch destination when the plurality of input terminals to be connected to the plurality of output terminals are switched by on/off control of the plurality of bidirectional switches; and
compensating means configured to compensate for an output voltage error generated when the plurality of input terminals to be connected to the plurality of output terminals are switched, based on at least:
a potential difference between a voltage at the plurality of input terminals before switching and a voltage at the plurality of output terminals after switching of the plurality of input terminals to be connected to the plurality of output terminals,
an output current of the plurality of output terminals, and
capacitance between input and output terminals of unidirectional switches included in the plurality of bidirectional switches.

13. A method of controlling a matrix converter,
the matrix converter comprising:
power converting means comprising:
a plurality of bidirectional switches
a plurality of input terminals configured to be connected to phases of an AC power source and,
a plurality of output terminals configured to be connected to phases of a load,
wherein the plurality of bidirectional switches connect the plurality of input terminals and the plurality of output terminals to each other;
the method comprising:
performing one of a three-step commutation operation and a four-step commutation operation by the plurality of bidirectional switches as a switch source and the plurality of bidirectional switches as a switch destination when the plurality of input terminals to be connected to the plurality of output terminals are switched by on/off control of the plurality of bidirectional switches; and
compensating for an output voltage error generated when the plurality of input terminals to be connected to the plurality of output terminals are switched, based on at least:
a potential difference between a voltage at the plurality of input terminals before switching and a voltage at the plurality of output terminals after switching of the plurality of input terminals to be connected to the plurality of output terminals,
an output current of the plurality of output terminals, and
capacitance between input and output terminals of unidirectional switches included in the plurality of bidirectional switches.

\* \* \* \* \*